Nov. 25, 1924. 1,516,499
C. F. PYM
MACHINE FOR USE IN THE LASTING OF BOOTS AND SHOES
Filed March 6, 1920 9 Sheets-Sheet 5

INVENTOR
Charles F. Pym

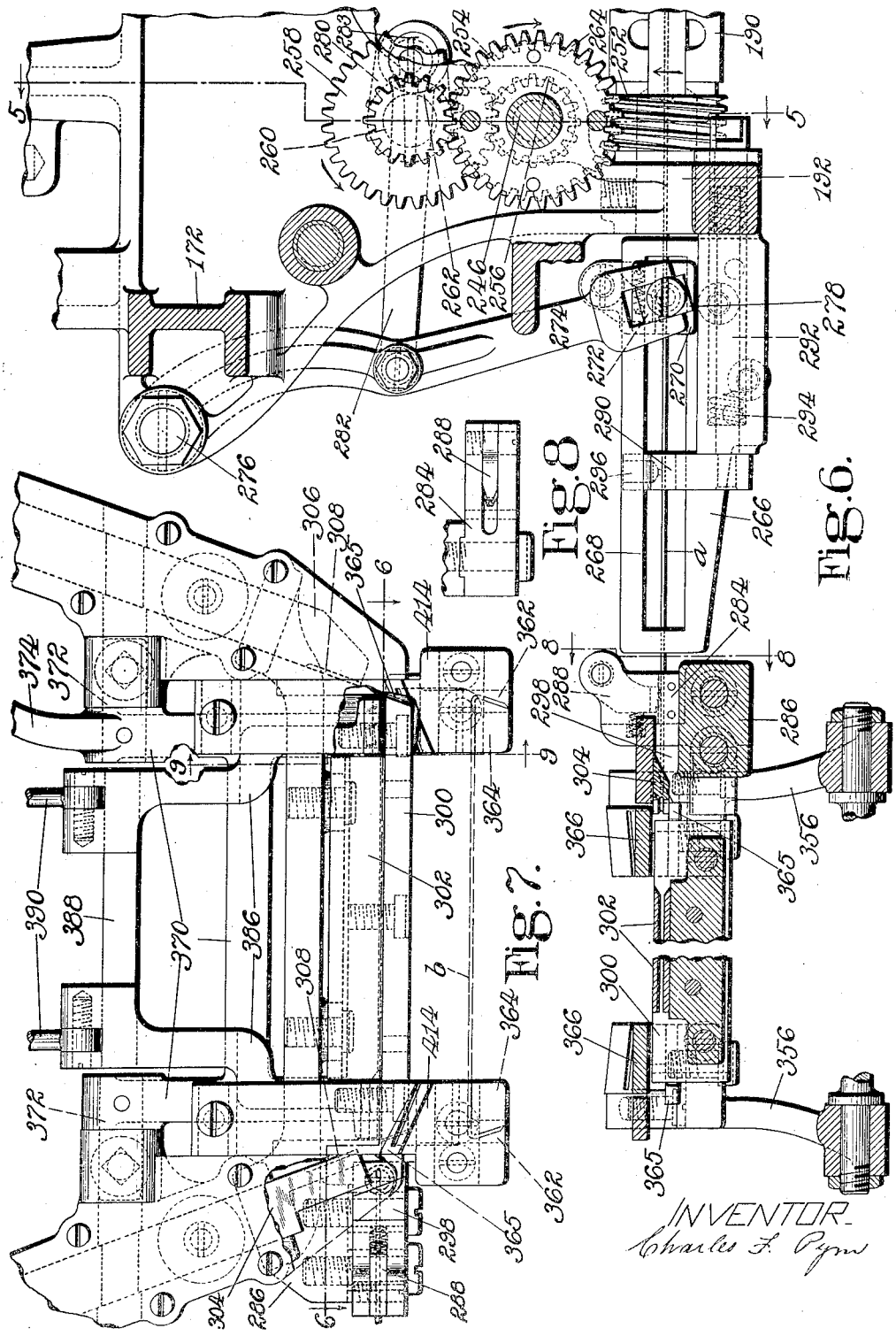

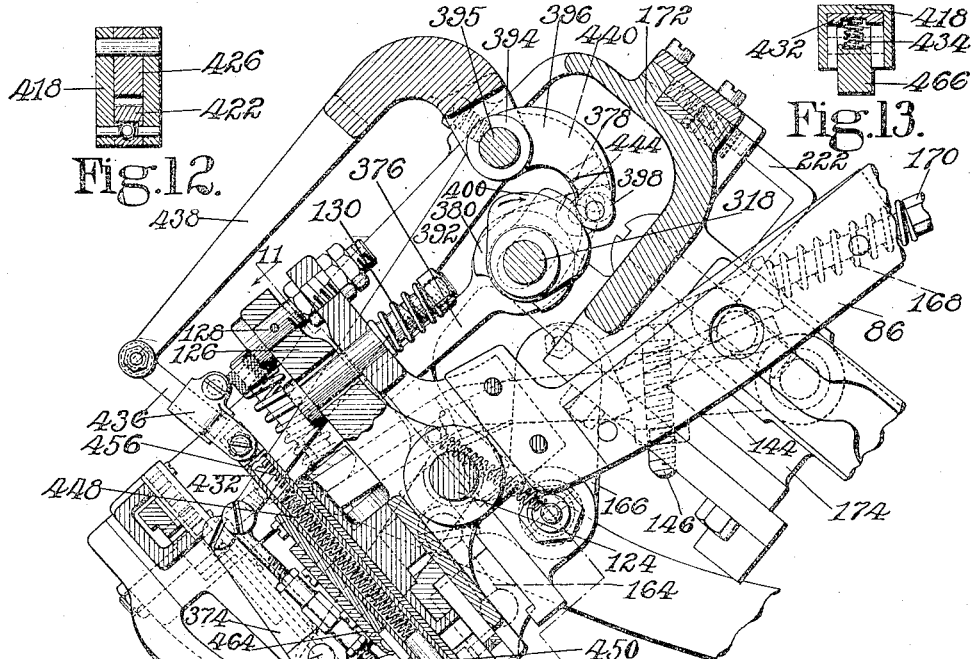

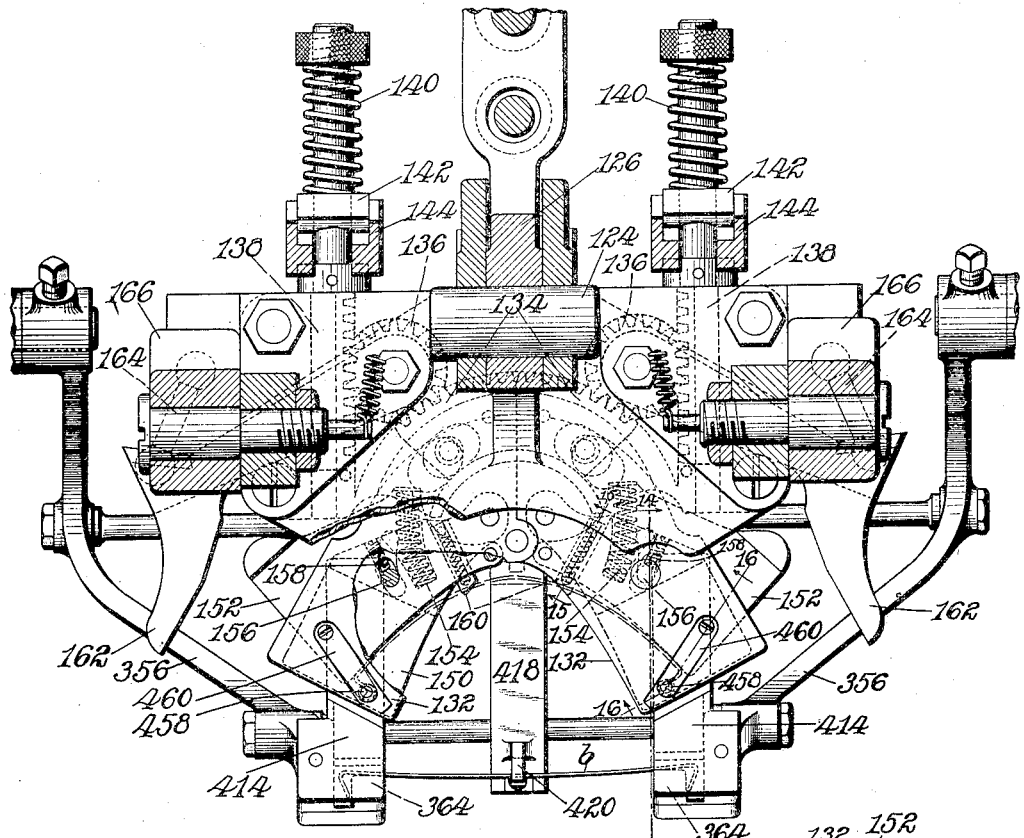

Nov. 25, 1924. 1,516,499
C. F. PYM
MACHINE FOR USE IN THE LASTING OF BOOTS AND SHOES
Filed March 6, 1920    9 Sheets-Sheet 9

INVENTOR
Charles F. Pym

Patented Nov. 25, 1924.

1,516,499

UNITED STATES PATENT OFFICE.

CHARLES F. PYM, OF LYNN, MASSACHUSETTS, ASSIGNOR TO UNITED SHOE MACHINERY CORPORATION, OF PATERSON, NEW JERSEY, A CORPORATION OF NEW JERSEY.

MACHINE FOR USE IN THE LASTING OF BOOTS AND SHOES.

Application filed March 6, 1920. Serial No. 363,827.

*To all whom it may concern:*

Be it known that I, CHARLES F. PYM, a subject of the King of England, residing at Lynn, in the county of Essex and State of Massachusetts, have invented certain Improvements in Machines for Use in the Lasting of Boots and Shoes, of which the following description, in connection with the accompanying drawings, is a specification, like reference characters on the drawings indicating like parts in the several figures.

This invention relates to machines for use in the manufacture of boots and shoes, and has more particular reference to that part of shoe manufacture wherein the upper is shaped to the contour of the last and is fastened in lasted position.

In lasting the toe ends of well-known types of shoes, including welt shoes and turn shoes, it is the common practice to fasten the upper in lasted position by means of a binder consisting usually of a section of wire or similar material applied tightly round the end of the shoe and secured at the opposite sides of the shoe. The present invention, among its important features, provides a novel oragnization of means for appiying a binder to a shoe and for presenting binder material, or a binder, for use on a shoe. The illustrative embodiment of the invention comprises toe lasting wiper mechanism mounted for movement toward and from a shoe and including means for applying a binder round the end of the shoe, and mechanism automatically operative in time relation to the lasting mechanism to present to the binder applying means a binder previously prepared for use on a shoe. More particularly, the novel organization herein shown comprises a carrier constructed to support a binder and mounted for movement toward the lasting mechanism, and a gripper on the lasting mechanism movable to withdraw the binder from the carrier and to deliver it to the binder applying means. In the illustrative machine the different operations are so timed as to present to the lasting mechanism immediately after the lasting of a shoe a binder to be operated upon by the binder applying means in the lasting of the next succeeding shoe. Important features of the invention are to be recognized in the general organization of the machine for the purposes in view and in details of construction of the different mechanisms.

Further important features of the invention reside in a novel organization of means for applying a binder to a shoe and for preparing, or forming, a binder to be operated upon by the binder applying means. In the construction shown binder forming mechanism is supported independently of the lasting mechanism and is power operated in time relation to the lasting mechanism, and the binder is delivered from the forming mechanism to a carrier which conveys it to the lasting mechanism into position to be engaged by a gripper and presented to the binder applying means in the manner above set forth. As applied to a type of machine adapted to utilize a binder having prongs to be forced into the shoe materials to serve as anchoring or securing means, for example in the manner illustrated in Letters Patent No. 1,436,194 granted upon my application on Nov. 21, 1922, the invention further provides a novel construction and arrangement of means for forming a binder with angled ends to serve as anchoring prongs and for presenting the binder thus formed to the binder applying means. In addition to important features embodied in the combination of binder forming and transferring means, additional features of the invention are to be recognized in various details of the binder forming mechanism. Still other features reside in novel means for guiding and feeding a stand of binder material into position to be operated upon by binder forming mechanism, and in novel means for controlling the operations of the different mechanisms having to do with the feeding of the binder material and the forming of the binder and its transferrence to the binder applying means and for timing these operations relatively to the operation of the lasting mechanism.

A further feature of the invention consists in novel means for positioning a binder relatively to binder applying means, the construction shown comprising members for engaging anchoring prongs on the ends of a binder to determine the lengthwise position of the binder. More particularly, the positioning means in the illustrative construction comprises pins past which the angled end portions of the binder slip as the binder is carried to the binder applying means and which serve when the binder is released to retain it in place and to centralize it relatively to the opposite side portions of the lasting mechanism.

A further feature of the invention consists in a novel heel rest mounted for positioning movement in conformity to the shape and position of a shoe, the illustrative construction comprising a V-shaped heel rest member so mounted as to permit it to turn about an axis extending lengthwise of the shoe in response to pressure of the shoe against it. Such a construction has important advantages, particularly in combination with means for laying the margin of an upper over the sole at the forepart of a shoe, as insuring against undesirable lateral tipping movement of the shoe by the action of the heel rest in such manner as to displace the forepart relatively to the opposite side portions of the overlaying means.

The above and other features of the invention, including also novel pulling-over gripper mechanism, novel means of control to insure against starting of the binder applying means at such time as to interfere with the proper operation of the binder presenting means, and various details of construction and combinations of parts, will be described more fully with reference to the accompanying drawings and pointed out in the claims.

While the invention is herein shown as embodied in a machine having means for performing both pulling-over and toe lasting operations, including binder applying means embodying features of the disclosure of the prior patent above mentioned, and while many novel and advantageous features of the invention are to be recognized in the application of the invention to such machines, it will be understood that in many of its novel aspects the invention is not limited to machines of the illustrative type. It will also be understood that while the invention is herein illustrated particularly by reference to its use in the manufacture of turn shoes, it is not limited in utility to the manufacture of any particular type of shoe.

In the drawings:

Fig. 1 is a view in side elevation of the head portion of the illustrative machine, Fig. 2 shows the wire feeding and the binder forming and transferring mechanisms, together with the associated toe lasting mechanism, as viewed diagonally from a position above and in front of said mechanisms, with parts broken away to reveal the interior construction, Fig. 3 shows substantially the same portion of the machine as Fig. 2, viewed from a point below and in front of the structure, with parts broken away, Fig. 4 is a view partly in side elevation and partly in vertical section of a portion of the structure shown in Fig. 1, the plane of section of a portion of the mechanism being indicated by the line 4—4 of Figs. 2 and 3, Fig. 5 is a sectional view on the line 5—5 of Figs. 2, 3 and 6, Fig. 6 is a section substantially on the line 6—6 of Figs. 3, 5 and 7, showing the wire feeding mechanism and a portion of the binder forming mechanism, Fig. 7 is a section on the line 7—7 of Fig. 4, illustrating the relation between the binder forming mechanism and the binder carrier, Fig. 8 is a section on the line 8—8 of Fig. 6, Fig. 9 is a section on the line 9—9 of Fig. 7, Fig. 10 is a view generally similar to Fig. 4 of parts of the structure there shown as they appear at a different time in the cycle of operations, Fig. 11 is a section on the line 11—11 of Fig. 10, Figs. 12 and 13 are detail sectional views on the lines 12—12 and 13—13 respectively of Fig. 10, Figs. 14, 15 and 16 are detail sectional views on the lines 14—14, 15—15 and 16—16 respectively of Fig. 11, Fig. 17 is a section of the line 17—17 of Fig. 4, Fig. 18 is a detail perspective view of a portion of the controlling mechanism;

Fig. 20 is a perspective view of a portion of the toe gripper mechanism with parts broken away, and Fig. 21 shows the toe portion of a shoe with the upper held in lasted position by the use of a binder made and applied by the machine.

Since, as above stated, the machine herein shown embodies in its general organization features of the type of machine illustrated and described in the prior patent above mentioned, including well-known pulling-over features shown and described in detail in other prior U. S. Letters Patent, for example in Patent No. 1,029,387 granted on June 11, 1912 upon an application of R. F. McFeely, these general characteristics of the machine, in so far as they are not modified for the purposes of this invention, will be described only briefly, and for further information with reference to such details of the construction reference may be made to said prior disclosures.

Figure 19:
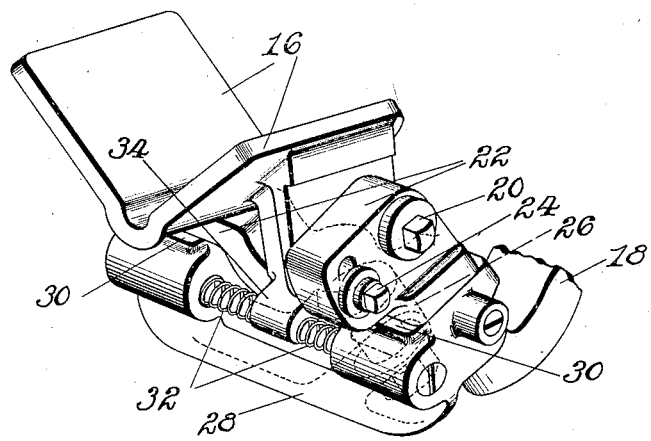
Fig. 19 is a perspective view of the heel rest structure.

In common with prior machines of the illustrative type, the machine herein shown is provided with side grippers having jaws 2 for gripping and pulling the margin of an upper at opposite sides of the forepart, and a toe gripper having two pairs of jaws 4 angularly disposed for engagement with the upper round the end of the last, the toe gripper and the side grippers being connected respectively to updraw levers 6 and 8 which are operated through the usual updraw springs by cams on a cam shaft 10 to grip and to pull the upper yieldingly. The shoe is positioned initially in operative relation to the grippers in the manner illustrated in Fig. 4 with the bottom face of the sole in engagement with a sole rest 12 which, through the action of a cam 14, receives a short downward tipping movement to depress the last simultaneously with the operation of the grippers. The sole rest, as shown, has means for engaging the sole over the ball of the last and is also provided with means, hereinafter more particularly described, for engaging the edge of the sole at the toe end of the last, these different parts co-operating to determine the plane of the forepart of the sole relatively to the means provided for lasting the shoe. In the course of the upper pulling operation a heel rest is moved forwardly into supporting relation to the heel end of the shoe by the well-known means characteristic of this type of machine, the heel rest, as shown in Fig. 19, comprising a shoe engaging member 16 of substantially V-shape with its diverging side portions adapted to receive and center the heel end of the shoe between them by engagement with the opposite side faces of the heel end portion. As in prior constructions, the member 16 is supported by a pair of arms 18 which are mounted to swing laterally of the shoe to permit the rest to adjust itself to the "swing" of the last and to the heel ends of right and left shoes, and the member 16 is also adjustable about an axis extending laterally of the shoe through the provision of a pair of opposite pivot studs 20, one of which is seen in Fig. 19, these studs being mounted in a supporting block 22, and a clamping screw 24 secures the member in adjusted position on said block. In the present construction the heel rest member 16 is mounted also to turn about an axis extending generally lengthwise of the shoe to permit it to adjust itself to the heel end of the last without danger of tipping the last laterally in such manner as to displace it relatively to the plane of action of the lasting mechanism. To this end the supporting block 22 carries a pivot stud 26 which turns in a bracket 28 pivotally mounted on the lower ends of the arms 18, the block being slidably supported at opposite sides on faces 30 on the bracket. The block 22 and the member 16 are normally centralized with respect to turning movement about the axis of the pivot 26 by means of light springs 32 which are mounted in sockets in the bracket 28 and are arranged for engagement respectively with the opposite sides of a projection 34 on the block 22. When the heel rest member 16 is moved forwardly into engagement with the shoe it is permitted to turn against the tension of one or the other of the light springs 32 and thus to adjust itself to the heel end of the last without affecting the proper relation of the shoe to the toe lasting mechanism. An important advantage in the provision for such conforming movement of the heel rest member arises from the well-known fact that the lasts used in the manufacture of different styles of shoes often differ materially in respect to the angular relation between the plane of the forepart of the last bottom and the vertical plane of the heel end portion of the last, in consequence of which the heel ends of different shoes whose foreparts are positioned in uniform relation to the sole rest in the manner above described may assume different degrees of "twist" relatively to the heel rest, and without such provision for turning movement of the heel rest member the latter by wedging action of the shoe might tip the shoe about its longitudinal axis. This feature is of importance not only in combination with toe lasting wiper mechanism, as shown, but also in its relation to the side overlaying and tacking means hereinafter more particularly referred to, and presents manifest advantages generally in relation to overlaying means such as heretofore commonly used in pulling-over machines irrespective of the use of lasting mechanism.

The construction of the toe gripper and its controlling mechanism, which embodies many features common to well-known prior constructions as illustrated for example in U. S. Letters Patent No. 1,030,264 granted on June 18, 1912 upon an application of R. F. McFeely, is shown particularly in Figs. 4 and 20, certain features of this gripper being claimed in my pending application Ser. No. 577,377, filed on July 25, 1922.

The gripper comprises a gripper bar 36 which is connected at its upper end to the updraw lever 6 and at its lower end is slidable in a gripper casing 38 which has lugs 39 for engagement with a portion of the frame of the machine to limit downward movement of the casing and permit the bar to slide downwardly in the casing against the tension of a compression spring 40, this spring being positioned within a recess in the bar and acting oppositely against the bar and a block 41 secured within the casing 38. The bar 36 is provided with a lengthwise slot to receive this block and to permit the bar to extend downwardly at opposite sides of the block. The gripper is provided with two pairs of jaws 4 mounted on holders 42 which have sleeve portions 43 extending into sockets in the casing 38 and secured by set screws 44. Each pair of jaws may thus be adjusted independently by turning its holder 42 to conform the gripper with substantial accuracy to the shape of the toe portion of the style of shoe upon which the machine is to operate, the set screws 44 when tightened serving to hold the jaws in adjusted position. The inner jaw of each pair is fixed to its holder 42 and the outer jaw is pivoted on the holder and provided with a curved tail portion to be operated upon by a roll 45 for swinging the jaw into gripping position. The rolls 45 are mounted on stems 46 which are slidable in the respective sleeves 43 of the holders and are provided with peripheral grooves to receive the ends of a rocker or equalizer 47 which is pivotally mounted on a closing block 48 loosely positioned within the casing 38. In its front side the block 48 is provided with an opening to receive a latch 49 which is pivotally mounted on the lower end of the gripper bar 36 and is swung outwardly by a spring 50. The latch 49 thus serves to connect the gripper bar to the block 48, and in the initial portion of the upward operative movement of the bar, while the spring 40 holds the casing 38 in stationary position with its lugs 39 resting on the frame, the block 48 is moved upwardly within the casing and through the rocker 47 and the stems 46 imparts closing movement to the pivoted jaws, the pressure of the respective jaws upon the stock being substantially equalized through the provision for rocking movement of the member 47. As soon as resistance of the upper to the closing of the jaws becomes sufficiently great the casing 38 begins to move upwardly with the bar 36 and the grippers are thus operated to pull the upper. Also pivotally mounted on the block 48 and extending outwardly through the opening in its front side is a tripping member 52 which is arranged to engage the lower hooked end of the latch 49 and is operated subsequently to the pulling of the upper, by means to be hereinafter described, to press the latch 49 backwardly out of engagement with the wall of the block 48 and thus to break the connection between the gripper bar and the pivoted jaws and permit the jaws to open and release the upper. It will be noted that on the front side of the casing 38 is secured a plate 53 which is provided with a slot extending lengthwise of the casing to permit the tripping member 52 to project outwardly through the casing and to receive upward and downward movement relatively to the casing in the closing and opening of the gripper jaws. It will be understood that in the return of the parts to starting position the gripper bar 36 continues its downward movement after movement of the casing 38 is stopped by engagement of the lugs 39 with the frame and that in this manner the latch 49 is moved into position to connect the bar again to the block 48.

In the construction herein shown the gripper casing 38 on its rear side is provided with a sloping wedge face 54 in engagement with a roll 56 mounted to turn on a rod 57 which is supported in a pair of blocks 58 on the frame of the machine, and by this construction the gripper in the upper pulling operation receives a diagonally forward movement to assist in drafting the upper lengthwise of the last. Springs 60 connected to the casing 38 and to angle bars 62 on the blocks 58 act to pull the gripper rearwardly at all times as far as permitted by the roll 56.

It will be understood that machines of the well-known type illustrated are provided with controlling means actuated by upward movement of a treadle rod 64 to start the machine and automatically operative to bring the machine to a stop after the grippers have pulled the upper and while they are holding it under tension. The operator is then permitted to inspect the work and to make any of the numerous characteristic adjustments which may be required by the condition of the work, including movement of one or more of the gripper levers 6 and 8 to vary the tension of the upper or to adjust it on the last. To facilitate such movement of the levers they are provided, in the construction herein shown, with handle portions 66 and 68 which extend downwardly and forwardly toward the operator in angular relation to the levers. The operator is also permitted at this time to relax the closing pressure of the toe gripper jaws on the upper to a greater or less extent to permit readjustment of the upper within the jaws as may be required by the tensioned condition of the upper, the toe gripper for this purpose having a slide 70 which in the construction shown is an upward extension of the plate 53 on the front of the gripper casing 38 and at its upper end has an angular portion 72 arranged to be engaged by a pivoted member 74 on the gripper lever, this member being geared to a second pivoted member 76 having a pin and slot connection 77 with a lever 78 which is pivotally mounted at 79 on the handle extension 66. By pressing upon the member 78 with the same hand which engages the handle 66 the operator is enabled through the connections described to move the slide 70 upwardly and thus to move the gripper casing relatively to the gripper bar 36 and the block 48 in such manner as to relax the closing pressure of the jaws to the extent required to permit them to slip more or less on the upper, as will be readily understood.

When the machine is started a second time, side clamp arms 80 are swung inwardly into operative relation to the shoe, these arms having pads 82 of yieldable material for clamping engagement with the shoe at opposite sides of the forepart and members 84 which engage under the forepart of the shoe to support it against subsequent downward pressure. The members 84 are mounted for rocking movement into conformity to the shape of the shoe and in the construction shown present rigid metal faces for engagement with the shoe to support it substantially unyieldingly against downward pressure on the shoe bottom. In the continued operation of the machine, operative movement is imparted to the different mechanisms whereby the upper is wiped inwardly and fastened in lasted position round the toe and is overlaid and fastened at the sides of the forepart at the rear of the toe end. The toe lasting mechanism includes a swinging front arm 86 which supports the wipers and associated parts, this arm being connected to a slide 88 which is moved rearwardly to swing the arm toward the shoe. Devices for overlaying and fastening the upper at the sides, comprising side wipers and tackers which may be constructed substantially as in prior machines of this general type, are mounted on side arms 90, to which inward movement laterally of the shoe is imparted by the same rearward movement of the slide 88. It will be understood that this slide serves in the latter portion of its rearward movement to actuate the devices whereby the securing tacks are driven at the sides of the shoe, and that subsequently, in the return of the parts to starting position, the slide has a downward swinging movement, a forward movement and an upward movement to the starting position indicated in Fig. 4. It will also be understood that the rearward movement of the slide 88 is accompanied by a corresponding movement of a slide 92 which normally spaces the opposite side grippers laterally of the shoe, and that in consequence of such movement of the slide 92 the side grippers are permitted to swing inwardly over the bottom of the shoe in advance of the side overlaying and tacking devices and are finally tripped in a well-known manner by the action of the side arms 90 to cause them to release the upper.

Figure 4:
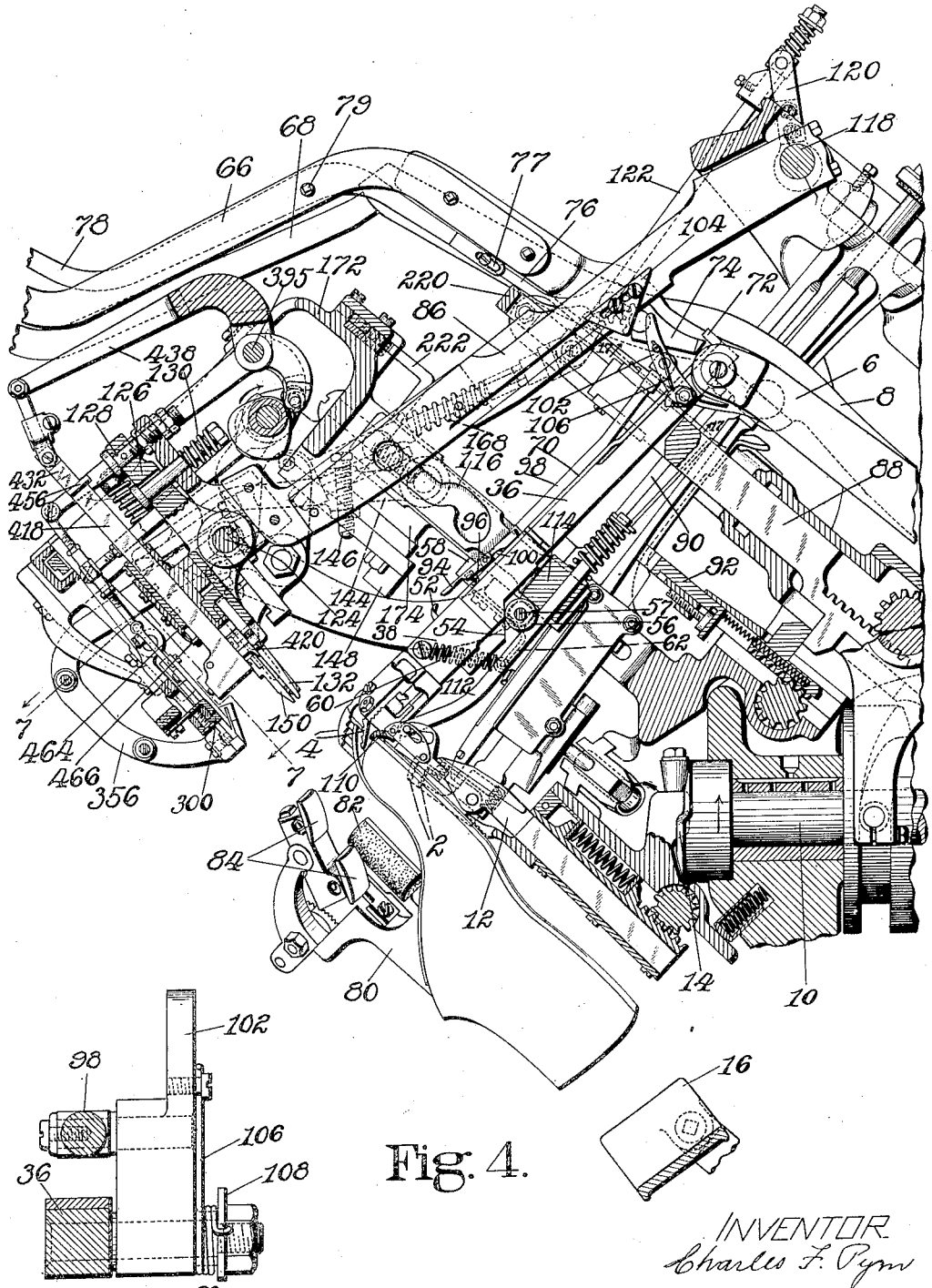

In the present construction the toe gripper is restrained by the roll 56 from rearward movement over the shoe, and as soon as the toe lasting mechanism has arrived in position to press the upper inwardly round the toe in such manner as to insure against loss of the pulling-over tension the toe gripper jaws are opened to cause them to release the upper and the gripper is permitted to move upwardly out of the way in response to the action of its updraw spring. The opening of the jaws takes place in consequence of inward movement of the tripping member 52 which, as hereinbefore explained, serves as means for disconnecting the latch 49 from the jaw closing block 48 in the gripper casing. Such movement of the member 52 is effected in the present construction by the action of an operating member or lever 94 which is pivoted on the block 41 in the gripper casing 38 and is normally held by a spring 96 in the position indicated in Fig. 4 to permit the member 52 to be moved upwardly behind it in the jaw closing movement of the bar 36 and the block 48 while the casing 38 is still stationary. For swinging the lever 94 about its pivot to press the tripping member 52 inwardly the machine is provided with a slide or bar 98 on the lower end of which is a lug 100 which is slidably positioned between the member 70 and the upper end of the lever 94, the latter having a cam face to co-operate with the lug. At its upper end the bar 98 is connected to an arm 102 which is pivotally mounted on the gripper bar 36 and is arranged to be engaged and elevated at a predetermined time in the rearward movement of the lasting mechanism by means of an operating member 104 adjustably mounted on the arm 86. A spring 106 normally acts to depress the arm 102 and the bar 98 to position the lug 100 as indicated in Fig. 4, this spring being connected to a plate 108 (Fig. 17) which may be turned and secured in different positions to vary the tension of the spring. Through the action of this mechanism upward sliding movement is imparted to the lug 100 at a time in the rearward movement of the lasting means which may be varied by adjustment of the member 104, to cause the lug to swing the member 94 in such manner as to press the tripping member 52 inwardly and effect the release of the gripper jaws from their closing means.

Similarly to the construction shown in my prior patent, the machine is further provided with a work positioning member 110 which is pivotally mounted on a portion of the sole rest 12 for swinging movement into and out of operative relation to the toe end portion of the sole and is normally held in the position indicated in Fig. 4 for engagement with the edge portion of the sole to hold the sole in the correct relation to the plane of the last bottom during the upper pulling operation and also to assist in determining the lengthwise inclination of the shoe. In the construction shown the member 110 is also provided with a lip to extend downwardly in front of the edge face of the sole and assist in determining the lengthwise position of the shoe. It will be understood that the member 110 is swung upwardly and backwardly out of the path of movement of the wipers at a predetermined time in the advance of the wipers toward the shoe by the action of a rod 112 under control of an operating member 114 which supports the rod and is mounted to turn on the pivot rod 57, the member 114 being provided with cam slots 116 to receive operating rolls carried by the swinging front arm 86 whereby the member 114 is operated to effect the withdrawal of the sole engaging member. In common also with the earlier construction the present machine is provided with an eccentric 118 which serves as a pivotal support for the arm 86 and is operated by means of a crank arm 120 and a rod 122 connected to the front end portion of the swinging slide 88 to depress the arm 86 and the wipers yieldingly after the latter have substantially completed their overwiping movement.

The toe lasting wiper mechanism and the binder applying mechanism, shown in detail in Fig. 11, are also in their general features broadly similar to the construction shown in the patent granted on my earlier application. Mounted on a transverse pivot 124 on the lower end of the arm 86 is a support 126 which may be conveniently termed a wiper carrier or wiper head, this support being adjustable about the pivot 124 to determine the correct angular relation of the wipers to the plane of the shoe bottom lengthwise of the shoe. A stud 128 fast on the wiper head 126 and extending through a projection on the arm 86 to which it is adjustably secured by clamping nuts serves to retain the wiper head in adjusted position, the adjustment being facilitated by the action of a spring 130 which tends to swing the head in one direction. The wipers 132 are pivotally connected together to swing about an axis at the end of the toe and are detachably secured to gear segments 134 to which operative movement is imparted by pinions 136 under the control of rack bars 138, the latter having at their outer ends springs 140 which through interposed washers 142 press inwardly against the lower forked ends of operating members 144. It will be understood that in the movement of the wiper mechanism toward the shoe stop screws 146, which are mounted on the members 144 and are independently adjustable to time the beginning of the closing movements of the different wiper plates, are carried into engagement with fixed stop lugs 148, and that as the wiper head continues its movement toward the shoe operative closing movement is imparted to the wipers through the rack bars, the pinions, and the gear segments with provision for yield of each wiper independently against the tension of its spring 140. On the lower sides of the wipers 132 are pivoted shoe end embracing plates 150, and between these plates and the wipers are pivoted members 152, which may be conveniently termed driver plates, for applying the binder to the shoe and for driving its prongs into the shoe. Springs 154 acting oppositely against the shoe embracing plates 150 and lugs on the driver plates 152 serve to swing the former inwardly and the latter outwardly as far as permitted by pins 156 which are carried by the wipers and engage in slots in the respective plates 150 and 152. Stop screws 158 carried by the plates 150 and engaging the pins 156 serve to limit adjustably the extent of relative movement between these plates and the wiper plates. It will be understood that in the operative movement of the wipers the plates 150 are carried into position to embrace the end portion of the shoe closely along its lateral periphery round the end and along the sides of the toe and that the wipers then move relatively to these plates laterally of the shoe to perform the overwiping operation, their overwiping movement being limited by engagement of the pins 156 with the ends of the slots in the plates 150. Prior to the operative movement of the wipers the binder is positioned as indicated in Fig. 11 in the opening provided between the wiper plates and the plates 150 with its opposite end portions supported upon the plates 150, and after the wipers have substantially completed their operative movement the driver plates 152 are moved relatively to them to complete the application of the binder to the shoe and to force its ends into the shoe along the plane of the shoe bottom. In the present construction each of the underlying plates 150 carries a spring plunger 160, these plungers being arranged to project initially in advance of the supporting plates substantially at the corners of the toe to assist in supporting the binder and to yield in response to resistance of the shoe in the operation of the wiper mechanism. Operative movement is imparted to the driver plates 152 by swinging driver members 162 through links 164 and levers 166 connected yieldingly by mechanism including springs 168 and rods 170 to the front end portion of the slide 88, as more fully described in my prior patent. It will be understood that as in the prior machine, these driving mechanisms are operated by the downward swinging movement of the slide 88 following its rearward wiper operating movement.

Figure 1:
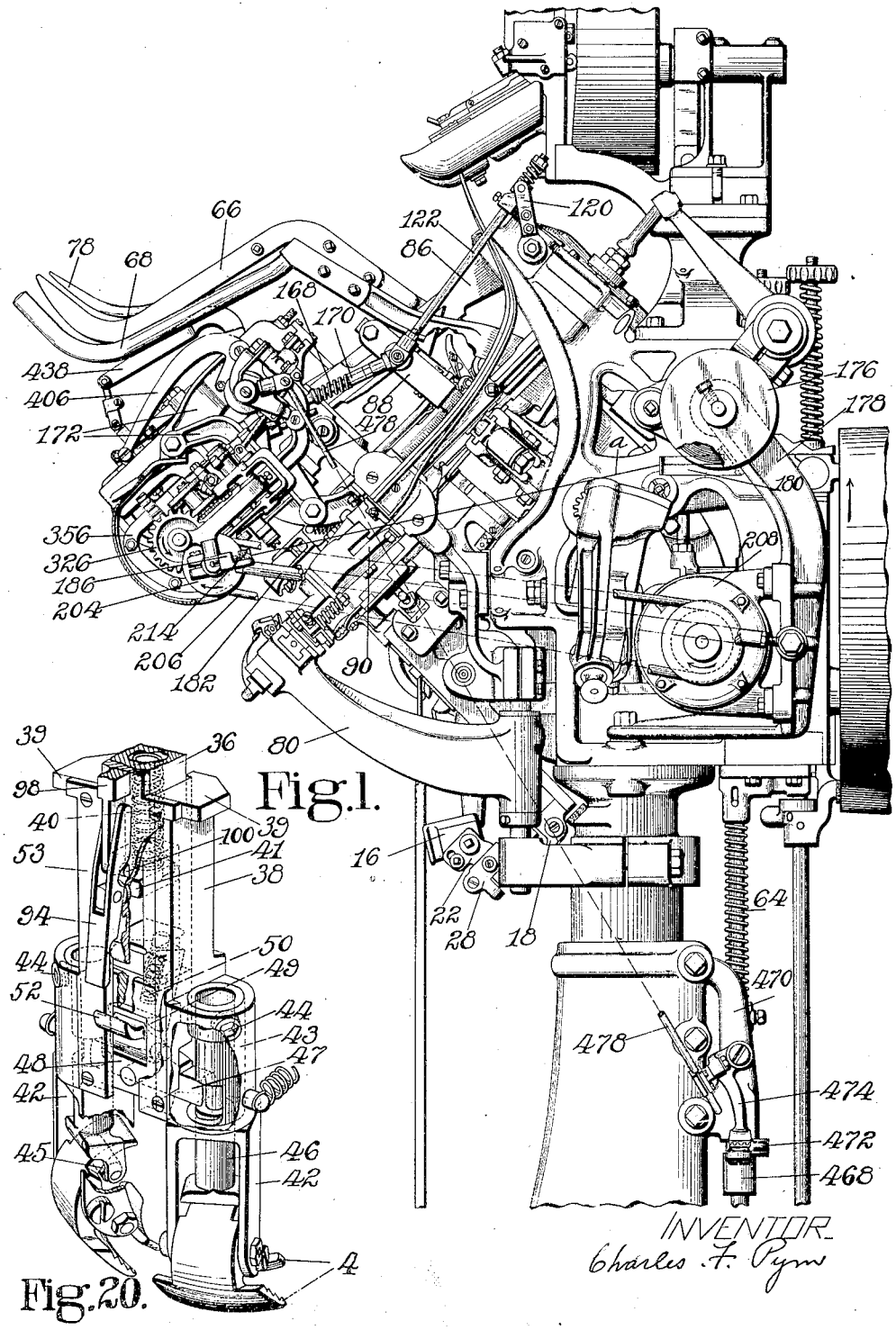
Figure 3:
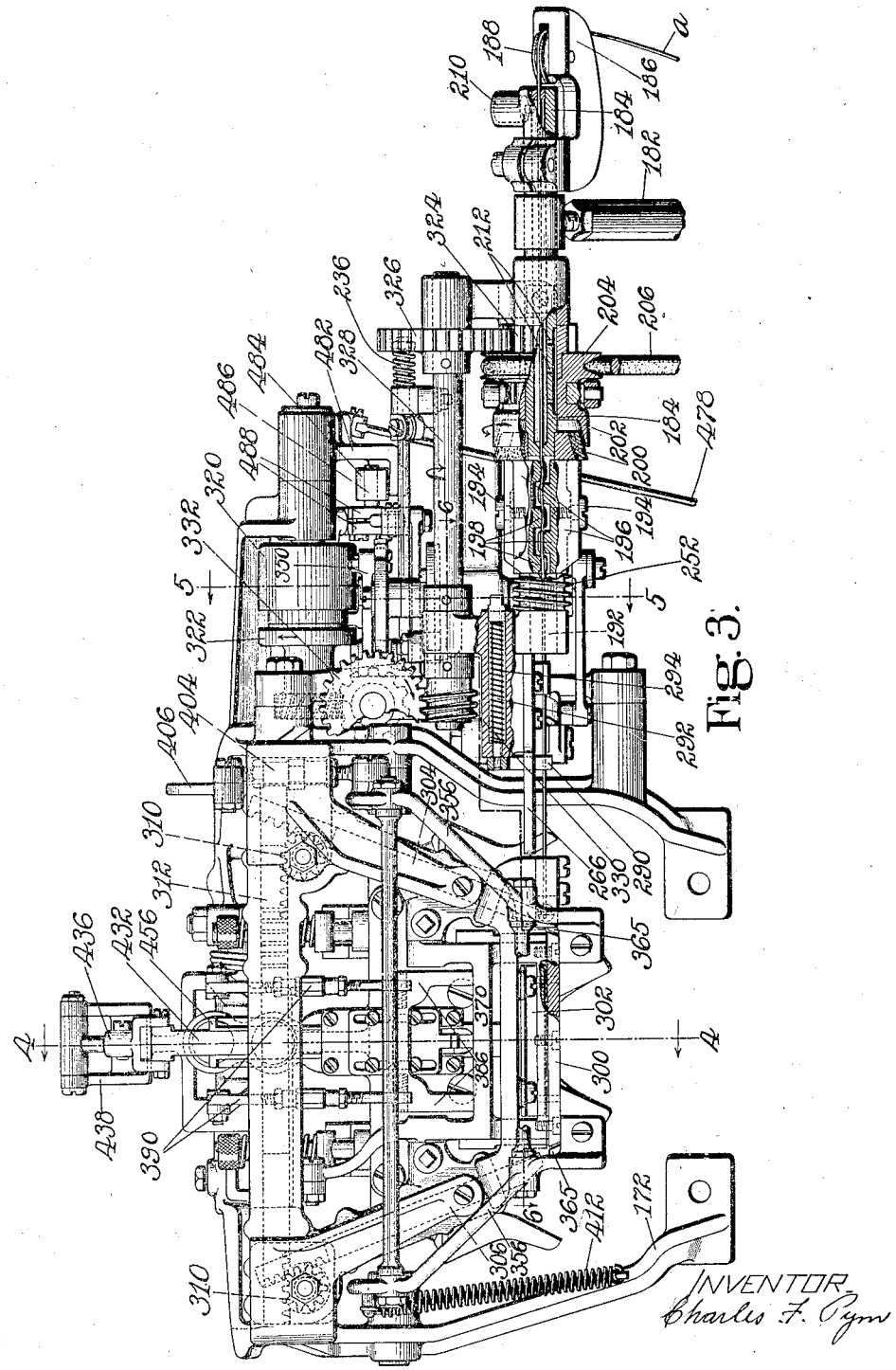

For the purpose of preparing a binder for use upon each shoe the machine is provided with mechanism supported upon a frame indicated generally at 172, this frame being secured in fixed position upon a part 174 of the head of the machine usually termed the front bracket and extending partially round the wiper and binder applying mechanism when the latter is in its normal starting position. A supply of binder wire is carried by a reel 176 (Fig. 1) mounted on a bracket 178 on one side of the machine and the wire $a$ is led thence through a guide 180 into operative relation to means whereby it is fed forward intermittently through straightening mechanism and into operative relation to means for severing portions of the proper length for binders and for bending the ends of each severed portion to provide prongs for attachment to the shoe. Secured in fixed position on the frame 172, and additionally supported by a tie rod 182, is a tubular rod 184 (Fig. 3) through which the wire is fed, this rod having clamped on its outer end a bracket 186 which supports a grooved guide roll 188 to direct the wire into the end of the rod, the latter having at each end a central aperture of substantially the same diameter as the wire through which the wire passes. From the rod 184 the wire is led through a straightening device which in the construction herein shown comprises a cylinder 190 rotatably supported at one end upon said rod and at its other end upon a stud 192 which is fixed in the frame and is provided with a central aperture for the wire. The cylinder 190 is provided with a transverse slot in which are secured by screws 194 a pair of opposed plates 196 having on their inner edges extensions 198 provided with grooves which are slightly out of alinement with one another when the plates are in operative position as indicated in Fig. 3. It will be evident that in the rapid rotation of the device round the wire as the latter passes lengthwise through it the projections 198 by their slight bending action in all directions upon every portion of the wire serve to remove effectually any kinks that it may have and to insure that as the wire emerges from the device it will lie straight without any tendency to curve in any direction.

At one end the cylinder 190 carries one member 200 of a cone clutch of which the co-operating member 202 is integral with a pulley 204 rotatably mounted on the fixed rod 184 and driven constantly through a belt 206 by an electric motor 208 supported on the bracket 178. It will be understood that normally the pulley 204 and the clutch member 202 turn idly on the rod 184. At its outer end the rod 184 carries an oil cup 210 adapted to deliver oil slowly into the interior of the tubular rod to lubricate the advancing wire and thus to guard against the deposit of scale from the wire in the interior of the rod and in the wire straightening mechanism through friction between the wire and the walls of the apertures through which it passes. It will be seen by reference to Fig. 3 that the rod 184 is also provided with apertures 212 to permit the passage of oil to serve as lubricating means for the pulley 204. In order further to guard against deposit of scale from the wire, the bracket 186 is provided with a piece of absorbent material 214 (Fig. 1) which is saturated with oil and engages the wire to lubricate it before it passes over the roll 188.

Figure 2:
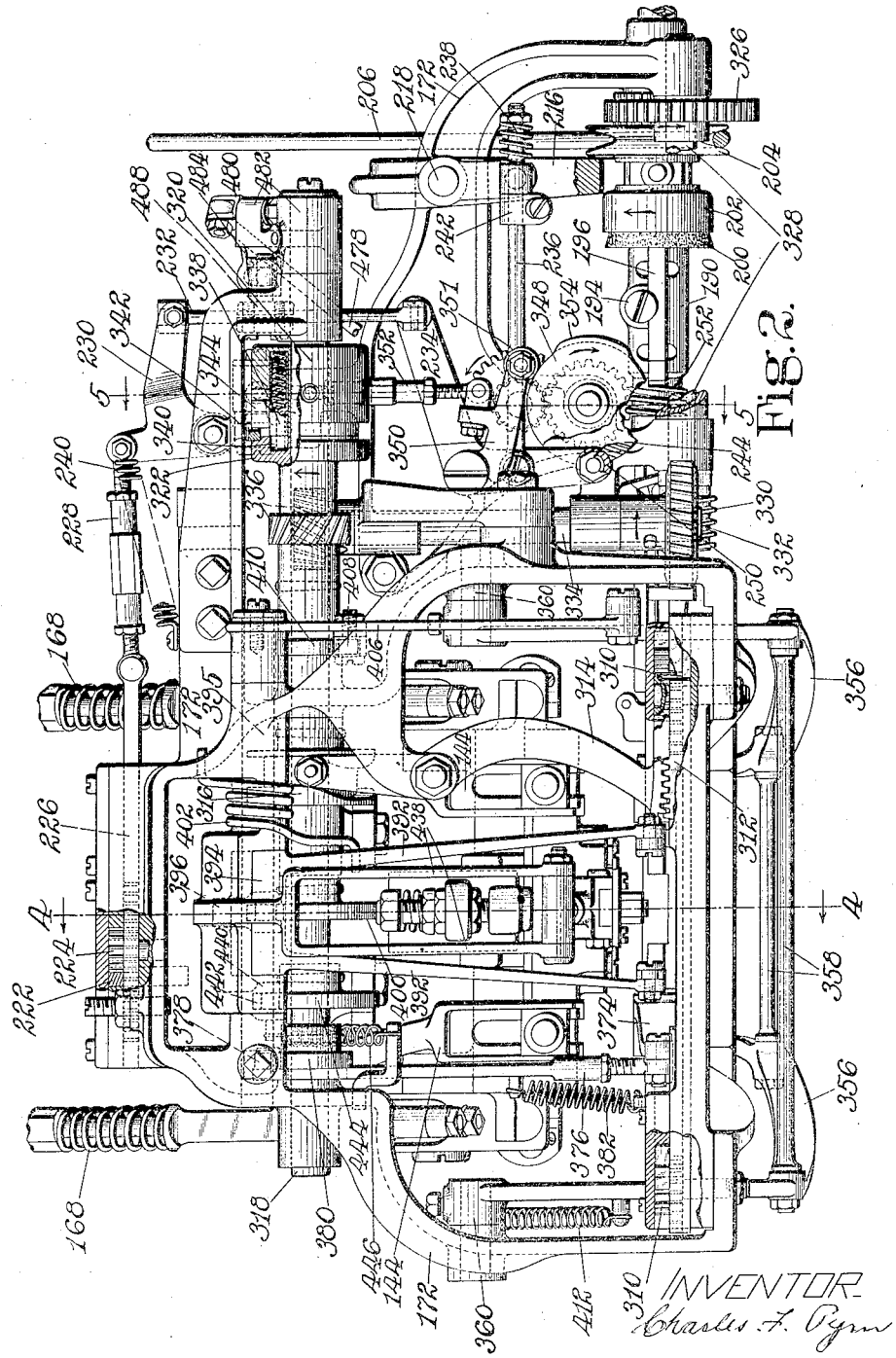

For transmitting movement to the wire straightening device, and through this device to other portions of the operating mechanism as will be hereinafter explained, the rotating clutch member 202 is moved into operative relation to the co-operating member 200 by the action of a clutch controller comprising a forked arm 216 (Fig. 2) which is mounted on a pivot stud 218 on the frame. The clutch is actuated to start the mechanism by the operation of the slide 88 as the latter is moved forwardly following its downward swinging movement, as hereinbefore explained, in the return of the parts of the pulling-over and lasting mechanisms to starting position. For this purpose there is secured on the front end of the slide in front of the arm 86 a plate 220 (Fig. 4) which in the forward movement of the slide engages the down-turned end of a rack bar 222 slidably mounted in a portion of the frame 172 and engaging a pinion 224 (Fig. 2) which is also in operative engagement with a rack bar 226 mounted at right angles to the bar 222 and connected through an adjustably extensible link 228 to one arm of a pivoted bell-crank lever 230. The other arm of the lever 230 is connected through a link 232 to one arm of a bell-crank lever 234 the other arm of which is connected yieldingly through a rod 236 and a spring 238 to the controller arm 216. A spring 240 connected to the bell-crank 230 normally serves to position the parts as indicated in Fig. 2 with the clutch member 202 held out of engagement with the member 200 by the action on the arm 216 of a member 242 which is clamped adjustably on the rod 236. When the rack bar 222 is moved forwardly by the member 220, movement toward the right (Fig. 2) is imparted to the bar 226 and the link 228 and through the connections described, including the spring 238, the arm 216 is moved yieldingly toward the left to actuate the clutch and start the operation of the wire straightening device and its connected mechanisms.

It will be understood that in time relation to its forward movement the slide 88 swings upwardly and thus carries the member 220 out of engagement with the rack bar 222. In order further to control the clutch 200, 202 to render it effective to transmit movement to the various mechanisms having to do with the feeding and straightening of the wire and the forming and transferring of the binder until the operating cycle has been completed, the machine is provided with a disk 244 which is rotatably mounted on a stud 246 (Fig. 5) rotatable in turn in a bearing 248 in the frame, this disk having a peripheral notch in which a roll 250 (Fig. 2) on one arm of the bell-crank 234 is received when the clutch is inactive. It will be understood that when the clutch is actuated as described the roll is moved out of the notch in the disk and that the latter by its action on the roll then serves to hold the parts of the clutch in operative relation until the cycle has been completed, whereupon the roll again slips into the notch and the parts of the clutch are disconnected. For imparting turning movement to the disk 244, and to other parts of the mechanism as will be described, the cylindrical member 190 of the straightening device is provided at one end with a worm 252 in engagement with a worm gear 254 fast on the lower end of the stud 246. Formed integrally with the stud 246 is a pinion 256 which meshes with a gear 258 formed on a second rotatable stud 260 on which is secured a pinion 262 operatively engaged with a gear 264 fast on the disk 244. It will be evident that reduction gearing is thus provided to cause the disk 244 to be driven at considerably slower speed than the stud 246, it being understood that the disk makes one complete revolution for each complete cycle of operations.

As the wire leaves the straightening mechanism it passes into operative relation to means whereby it is fed forwardly the required distance to permit a section of the accurate length to form a binder to be severed and operated upon by the forming means. The feeding mechanism (Fig. 6) comprises a plate 266 which is fast on that part of the frame in which the stud 192 is mounted, this plate having a slot 268 to provide a slideway for a feeding member, the latter comprising a block 270 provided with a spring held pawl 272 which is arranged to grip the wire and feed it forward as the member moves toward the left (Fig. 6) and to slip idly over the wire in the retractive movement of the member. For imparting operative movement to the member 270 the machine is provided with an arm 274 pivotally mounted at 276 on the frame and having a forked end to embrace a block 278 which is mounted to swivel on the member 270 on the opposite side of the plate 266 from the pawl 272. For imparting operative movement to the arm 274 the rotatable stud 260 hereinbefore described is provided with a crank arm 280 connected to the arm 274 by a pitman 282, the pitman being mounted on an eccentric 283 which is adjustable to permit regulation of the length of the feeding movement. To feed the proper length of wire into position two forward movements of the feeding member 270 are utilized, such movements being provided for by such a construction and arrangement of the gearing that the stud 260 makes two revolutions to the single revolution of the controller disk 244. As the wire is fed forward it passes through a retaining device comprising a guide member 284 which is fast on a part 286 of the frame and carries a spring held pawl 288 which acts automatically to prevent retractive movement of the wire.

In order to assist in supporting and guiding the wire in its passage from the straightening mechanism to the forming mechanism there is provided a member 290 guided for movement in and along the slot 268 and having an opening through which the wire passes, this member being mounted on a rod 292 which is slidable lengthwise in the frame in parallel relation to the slot 268 and is normally held by a spring 294 in the position indicated in Fig. 6 in which the member 290 engages one end of the supporting part in which the rod is mounted, this part serving as an abutment to position the member 290 approximately midway between the opposite ends of the slot 268 or of the path of movement of the feeding member. The member 290 thus supports the wire substantially midway between the straightening mechanism and the retaining pawl 288 during substantially the first half of each forward feeding movement of the member 270 and is then engaged by the feeding member and moved forwardly with it against the tension of the spring 294 during substantially the latter half of the feeding movement. When the feeding member 270 is moved reversely to its starting position the guide member 290 is returned by its spring to the intermediate position illustrated in Fig. 6. Preferably the member 290 is provided, as shown, with an oil cup 296 to assist in lubricating the wire after it has emerged from the straightening mechanism.

As the wire is advanced beyond the retaining pawl 288 it passes through an opening in a fixed shear block 298 and thence to portions of the forming mechanism comprising an anvil plate 300, a fixed guide plate 302 having a downturned edge portion close to the anvil plate and provided with a groove to receive the wire and direct it along the top of the anvil plate, and bending slides 304 and 306 which are advanced in their slide-ways in the frame after the wire has been fed into the correct relation to the anvil plate 300 to co-operate with the anvil plate to form the angled ends of the binder. As shown in Figs. 6 and 7, the slide 304 is constructed to co-operate with the shear block 298 to sever the wire, the shearing faces of these parts being inclined to the lengthwise dimension of the wire in order to produce sharp points on the angled ends of the binder. It will be seen by reference to Figs. 3 and 7 that the bending slides move in convergent directions and that the end faces of the anvil plate are correspondingly inclined to the top face of the plate for the purpose of producing in the binder acutely angled end portions to insure that the inturned ends shall serve effectively as anchoring prongs when driven into the shoe, as explained in my earlier application. It will be noted also by reference to Fig. 7 that the bending slides 304 and 306 have on the sides which face the end surfaces of the anvil plate grooves 308 to receive the ends of the wire as they are bent, these grooves and the groove in the guide plate 302 being disposed in predetermined relation.

Figure 5:
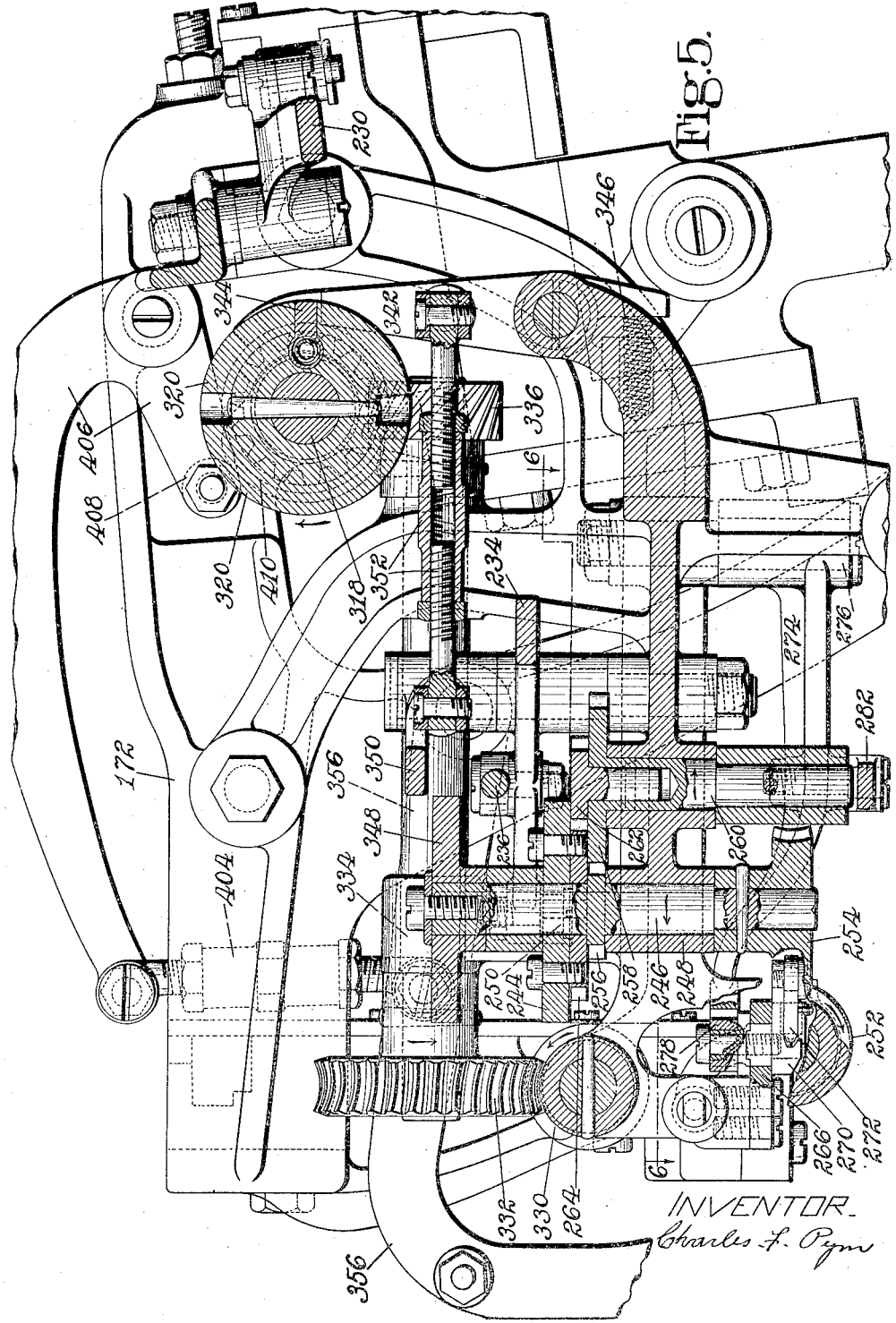

For operating the bending slides 304 and 306 there are provided pinions 310 (Fig. 3) which are in operative engagement with teeth cut in the slides and also with teeth on a transversely slidable rack bar 312 which has additional teeth in operative engagement with a gear segment formed on one end of a pivoted operating arm 314 (Fig. 2). Operative movement is imparted to the arm 314 by a grooved cam 316 fast on a cam shaft 318 which serves to operate the binder forming mechanism as well as other mechanisms to be hereinafter described. In the general cycle of operations the shaft 318 is held stationary until the point is reached where the wire has been fed forward substantially into the correct relation to the forming mechanism. At this point rotation of the shaft 318 is started through a clutch comprising a drum 320 (Fig. 2) which is fast on the shaft and a co-operating clutch member 322 which is loose on the shaft and is rotated continuously from the pulley 204 through gear connections. These connections comprise a pinion 324 which is fast on the pulley and engages a spur gear 326 on one end of a shaft 328, the latter having at its opposite end a worm 330 which drives a worm gear 332 fast on a shaft 334. The shaft 334 is connected to the clutch member 322 by spiral gears 336 one of which is fast on the hub of the clutch member. The drum 320 of the clutch carries a spring plunger 338 which is arranged to enter a recess 340 in the co-operating member 322 to connect the parts of the clutch but is normally held in retracted position outside of said recess by means of a pivoted controlling member 342 (Fig. 5) the end portion of which is beveled on one side to serve as a wedge face for engagement with a lug 344 on the plunger 338. A spring 346 normally holds the member 342 with its beveled end portion in the position indicated in Figs. 2 and 5 to disconnect the parts of the clutch and permit the member 322 to turn idly. In order to swing the member 342 into position to release the plunger 338 at that point in the cycle when it is required to start the rotation of the shaft 318, there is provided automatic controlling means comprising a cam disk 348 and a pivoted arm 350 provided with a roll 351 engaging the periphery of the disk 348 and connected through an extensible link 352 to the arm 342. The cam disk 348, as shown in Fig. 5, is fast with the controller disk 244 previously referred to, and therefore makes one revolution to each complete cycle of operations. On its periphery the disk 348 is provided with a cam projection 354 which at the proper time in the cycle acts to swing the arm 350 in the direction to actuate the clutch and start the movement of the shaft 318. It will be understood that this shaft makes one complete revolution before it is stopped, the cam 354 releasing the arm 350 in time to permit the member 342 to be returned by the spring 346 into position to retract the plunger 338 as the moving parts approach the end of the cycle.

After the ends of the severed section of binder material have been bent about the anvil plate to form the binder b, the bending slides 304 and 306 are immediately retracted to their starting position by the action of the cam 316. The binder is then to be transferred into operative relation to the binder applying mechanism on the movable wiper head. The transferring means includes a swinging carrier comprising curved arms 356 connected in fixed relation by transverse tie rods 358 and pivotally mounted by means of studs 360 on the frame 172. Secured on the lower ends of the arms 356 are carrier devices which receive the binder from the forming mechanism and by swinging movement of the arms carry it into alinement with the binder applying means. These devices each comprise a block 360 (Fig. 9) secured on a laterally projecting lug on the arm 356 and recessed on one side to provide a slideway or guideway 361 for the binder when the latter is released from the forming mechanism and an opening 362 (Fig. 7) to receive the prong on the end of the binder, the block having adjacent to this opening a ledge 364 for supporting the end of the binder. It will be seen by reference to Figs. 6 and 9 that each block 360 has a projection 365 which extends upwardly across the end of the anvil plate 300 in close relation to the beveled end face of said plate and in back of the position occupied by the binder. Secured to the block 360 is a plate 366 which forms the front wall of the guideway 361 and of the opening 362. Secured on the plate 366 and spaced from the downwardly extending portion of said plate is a plate 368 which extends downward substantially to the anvil plate and is provided with a beveled edge, as shown in Fig. 9, to project in back of the binder on the anvil plate beyond the adjacent end of the guide member 302, the latter terminating at some distance from the ends of the anvil plate, as shown in Fig.

6. Normally the parts are positioned as shown in Figs. 7 and 9 with the anvil plate 300 projecting substantially across the space between each plate 366 and its plate 368, and it is while the parts are thus positioned that the wire is fed in front of the lower edge portions of the plates 368 and the bending slides are operated to sever the wire and form the binder.

In order to release or discharge the binder from the forming mechanism, the anvil plate is swung backwardly away from the front plates 366 to the position indicated in Fig. 10. For this purpose the anvil plate is secured on a frame 370 mounted on pivot studs 372, this frame having an arm 374 pivotally connected to a link 376 which, as shown in Figs. 2 and 10, is slotted to embrace the shaft 318 and carries a roll 378 in engagement with a peripheral cam 380 on the shaft. A spring 382 (Fig. 2) connected to the link 376 holds the anvil plate in the position shown in Fig. 9 when permitted by the cam 380, and it is against the tension of this spring that the cam acts at the required time in the cycle to retract the anvil plate to the position indicated in Fig. 10. When this retractive movement of the plate is effected, the grooved guide member 302, the plates 368 and the upward extensions 365 of the blocks 360 at the ends of the anvil plate restrain the binder from corresponding retractive movement, and as soon as the anvil plate has passed from beneath the binder the latter may fall along the guideways 361 until it rests upon the ledges 364 in the position indicated in dotted lines in Fig. 7.

In order to insure the proper delivery of the binder to the carrier mechanism, the machine is provided further with delivery means comprising pusher plates 384 mounted to slide in the guideways provided between the plates 366 and 368 and along the guideways 361, these pusher plates having lower beveled edges, as indicated in Fig. 9, adapted to dislodge the binder if it should fail to fall as required and to advance it to its proper position on the carrier, and also to serve a further purpose to be hereinafter explained. The plates 384 are fast on curved supporting arms 386 (Fig. 7) which are shouldered to guide them along the edges of the plates 368 and are connected by a cross piece 388. Pivotally connected to the arms 386 are links 390 which are pivotally connected in turn to arms 392 (Figs. 2 and 10) projecting from a hub 394 which is mounted to turn on a supporting rod 395, the hub having also an arm 396 provided with a roll 398 in engagement with a peripheral cam 400. A spring 402 bearing on one of the arms 392 normally holds the pusher plates 384 in retracted position, as indicated in Fig. 9, and after the anvil plate 300 has been retracted movement is imparted to the pusher plates by the cam 400 against the tension of the spring 402 to move them downwardly toward the binder supporting ledges 364.

For imparting operative movement to the binder carrier one of the arms 356 is connected by an extensible link 404 (Fig. 5) to one arm of a bell-crank 406 the other arm of which carries a roll 408 in engagement with a peripheral cam 410 on the shaft 318. A spring 412 connected to the other arm 356 tends to swing the carrier in the direction for holding the roll 408 against its cam, and the cam, as shown in Fig. 5, has a high portion which acts against the tension of the spring to position the carrier initially with its opposite side portions in the relation to the binder forming mechanism illustrated in Fig. 9, in which position the carrier is adapted to receive the binder when it is released by the forming mechanism. After the pusher plates 384 have been moved downwardly as described, the cam 410 acts to release the carrier to the action of its spring 412, whereupon it is swung upwardly to present the binder in alinement with the binder applying mechanism on the wiper head, as indicated in Figs. 10, 11 and 14. It will be noted that at its lower end each of the plates 366 is enlarged as shown at 414 and provided with a slot 416 extending at an angle to the guideway or slot 361, and that the enlargements 414 have edge walls arranged to extend substantially parallel and in close relation to the end faces of the corresponding binder supporting plates 150 under the wipers, these end faces extending on an incline to the longitudinal median line of the wiper mechanism. In this position the slots 416 are in alinement with the openings between the wipers 132 and the plates 150. In order to insure such alinement, the position of the binder carrier is determined by engagement of its plates 366 with the plates 150, as indicated in Fig. 14, the cam 410 being so shaped as to permit the spring 412 to swing the carrier invariably into such relation to the wiper and binder applying mechanism. In order further to insure the correct relation between the parts, the pivot studs 360 on which the carrier is mounted are positioned in alinement with the stud 124 about the axis of which the wiper and binder applying mechanism may be adjusted as hereinbefore explained. Adjustment of the wipers accordingly interferes in no way with the proper operation of the binder carrier, since the latter is always swung to operative position by the action of its spring and such position is determined directly by engagement with the plates 150. It will be noted that the pusher plates 384, after having been moved downwardly as described, are held at their limit of downward movement as the carrier is swung to the position indicated in Figs. 10 and 14, such swinging movement of the pusher plates being permitted by their pivotal connection with the links 390. As thus positioned the lower beveled ends of the pusher plates are adapted to serve as extensions of the inner walls of the respective slots 416 to assist in guiding the binder along the slots, as will be hereinafter explained, the pusher plates being held in their lowermost position long enough to permit them to serve this purpose.

In order to transfer the binder from its carrier into position to be acted upon by the binder applying mechanism in the lasting of the next shoe, the machine is further provided with a transferring device comprising a supporting slide 418 mounted in a guideway in the wiper head underneath the wipers and having on its front end a projection 420 adapted to serve as one jaw of a binder engaging gripper the other jaw 422 of which is mounted in the slide 418 for movement at right angles to the direction of movement of the slide and into and out of gripping relation to the jaw 420. The jaw 422 is normally held in open relation to the other jaw by the action of a spring 424 which engages a projection 425 on the shank portion of the jaw. For moving the jaw 422 to gripping position it is provided with rack teeth in engagement with a closing member comprising a gear segment 426 which is pivotally mounted on the slide 418 and is provided with a projecting lug 428 arranged to be connected to a pawl 430. This pawl is pivoted on an inner closing slide 432 which is movable lengthwise in the slide 418, and a spring 434 acting between the inner slide and the pawl serves to hold the pawl with its hooked end normally in idle engagement with the member 426 at the back of the lug 428, as shown in Fig. 10. The slide 432 at its outer end is connected by an adjustably extensible link 436 to a forked arm 438 which is pivotally mounted on the rod 395 and is provided with an extension 440 having a roll 442 in engagement with a cam 444 on the shaft 318. A spring 446 acting on the extension 440 serves to hold the roll in engagement with this cam and to hold the transferring device normally in retracted position as indicated in Fig. 4. Within the slide 432 is a spring 448 which bears at one end against a plug in the end of the slide and at its other end against a plunger 450 which engages a pin 452 fast on the outer slide 418. The spring 448 thus tends to move the slides 418 and 432 relatively in opposite directions, such relative movement being limited by engagement with the pin 452 of a lug 454 on the inner slide.

In the operation of this mechanism, after the binder has been carried into alinement with the driver slides 152 as indicated in Fig. 14, the cam 444 acts to swing the arm 438 in the direction to move the two slides 418 and 432 forwardly toward the binder and to position the jaws for engagement with the binder substantially midway between its opposite ends. In the course of this movement a lug 456 on the outer end of the slide 418 engages an abutment on the supporting wiper head, as indicated in Fig. 10, whereby forward movement of the slide 418 and of the gripper jaws is limited. Preferably, in order to insure in all cases proper operative relation of the gripper to the binder, the extent of the forward movement of the jaws is such that the binder is bent slightly between its two supporting ledges 364, as indicated in Fig. 11. In the continued movement of the arm 438 the inner closing slide 432 is moved forwardly against the tension of the spring 448 and thereby the hooked end of the pawl 430 is moved forwardly over the projecting lug 428 on the gear segment 426. Movement in the reverse direction is now imparted to the arm 438 by the action of its spring 446, as permitted by the cam 444, and in this movement the hook-shaped end of the pawl 430 acts in engagement with the lug 428 to force the jaw 422 into gripping relation to the binder, the spring 448 holding the outer casing 418 and the supported gripper jaws in their foremost position until the jaws have firmly gripped the binder. Both casings are then moved rearwardly by the action of the arm 438, the pawl 430 holding the jaw 422 firmly in gripping position and serving as a connection between the jaw support 418 and the operating means. In this manner the binder is pulled along the slots 416 in the carrier devices and into the opening between the wiper plates 132 and the underlying plates 150.

In order to afford additional insurance that the binder shall be accurately centralized in the wipers, the wiper plates 132 are provided with pins 458 (Figs. 11 and 16) which are slidably mounted in openings in the plates under the control of leaf springs 460. The pins are provided with projections 462 which extend across the space between the plates 132 and 150 in position to be engaged by the end portions of the binder as the latter is pulled into place between the plates. It will be understood that in the latter portion of the operative movement of the binder transferring gripper above described the end portions of the binder slip past the projections 462 on the pins, whereupon the angled ends of the binder spring into place in back of the pins. When the binder is released by the gripper, in the manner to be described, the resiliency of the wire tends to straighten it, and in this way the outer edges of the prongs of the binder are pressed against the projections 462 on the pins, the binder thus being effectually centralized relatively to the wiper and binder applying mechanism, as indicated by broken lines in Fig. 11. In such position the intermediate portion of the binder is supported by the action of the spring plungers 160. It will be noted by reference to Fig. 16 that the projections 462 are beveled on the side toward the driver plates 152, and by reason of this construction the pins are lifted by the driving movement of the plates against the tension of their springs 460.

In order to effect the release of the binder from the gripper jaws, the wiper head has adjustably mounted upon it a plate 464 with a projecting end 465 in the path of the movement of a downwardly extending finger 466 on the pawl 430. As the gripper approaches the end of its operative movement the finger 466 is carried into engagement with this plate and the pawl is thus lifted, thereby releasing the member 428 and permitting the spring 424 to act to open the jaw 422 and release the binder. In order to insure the release of the binder at the proper point in the operative movement of the gripper, the cam 444 is so shaped as to stop the gripper substantially in the position indicated in Fig. 4. It will be understood that as the lasting mechanism and the gripper are swung toward the shoe in the lasting operation the roll 442 is swung away from the cam 444, whereupon through the action of the spring 446 further retractive movement is imparted to the gripper, forcing the finger 466 backwardly over the projection 465 and withdrawing the gripper jaw 420 into the opening (Fig. 11) provided between the pivotally mounted end portions of the plates 150 to prevent interference between the gripper and the shoe in the lasting operation. When the arm 86 is swung reversely to its starting position the cam 444 by its action on the roll 442 effects a reverse relative movement between the gripper and the wiper head to position the parts again as indicated in Fig. 4.

The manner in which the machine operates in the pulling-over and the lasting of the shoe will be clearly understood from the foregoing description and requires no further explanation. With reference to the different operations having to do with the forming of the binder and its transferrence into operative relation to the binder applying means, considered as a whole and in sequence, it may be briefly stated that in the return of the parts of the machine to starting position after the operations on a shoe have been completed the clutch 200, 202 is actuated in the manner described by the engagement of the member 220 on the slide 88 with the rack bar 222. Movement is then imparted through the clutch to the wire straightening mechanism and to the feeding mechanism, and through two successive forward movements of the feeding lever 274 a section of wire of the proper length to form a binder is advanced into operative relation to the forming mechanism, the leading end of the wire being moved into such a position that it projects beyond the farther end of the anvil plate 300 a distance corresponding to the required length of the projecting prong of the binder which is to be forced into the shoe. Substantially at the time when the arm 274 arrives at the end of its second feeding movement the cam 354 serves through the connections described to actuate the clutch 320, 322 to start the rotation of the shaft 318. As this shaft begins to turn the bending slides 304, 306 are operated by the cam 316 to sever a section of wire and to bend its ends over the end faces of the anvil plate, and are then immediately returned to starting position. The anvil plate is then retracted by the action of its cam 380 to release the binder from the forming mechanism, and the pusher plates 384 are moved downwardly by their cam 400 to insure that the binder shall be properly positioned in the carrier devices on the carrier arms 356. With these plates still held at the limit of their operative movement, the carrier is released by its cam 410 to the action of the spring 412 and is swung into the position indicated in Figs. 10 and 14 to present the slots 416 in the carrier devices in alinement with the opening between the wiper plates 132 and the plates 150. The cam 444 then operates the arm 438 to move the gripper device comprising the jaws 420, 422 to the position indicated in Figs. 10 and 11, whereupon the cam releases the arm 438 to the action of its spring 446 to cause it to close the jaws on the binder and to pull the binder into operative relation to the binder applying means and finally to release it, as already explained in detail. It will be understood that the operations of forming the binder and transferring it into position to be acted upon by the driver plates, and the return of the parts of the forming and transferring mechanisms to starting position, are performed by a single revolution of the shaft 318 which takes place as the feeding arm 274 is moving reversely to its starting position following its second forward feeding movement. As the arm nears the end of this reverse movement the cam 354 releases the mechanism which controls the clutch 320, 322 and the member 342 is swung into position to disconnect the shaft 318 from the source of power. Finally the controller disk 244 arrives in position to permit the roll 250 on the bell-crank 234 to enter the notch in the periphery of the disk, whereupon through the action of the spring 240 the member 202 of the main clutch is disconnected from the member 200 and the wire straightened and feeding mechanisms are brought to rest.

It will be understood that the operations of feeding the wire and of forming and transferring the binder take place in an interval of time sufficiently short to insure that before the operator has picked up another shoe and positioned it with the margin of the upper in the open gripper jaws the binder will be formed and transferred into place in the wiper and binder applying mechanism.

Figure 18:
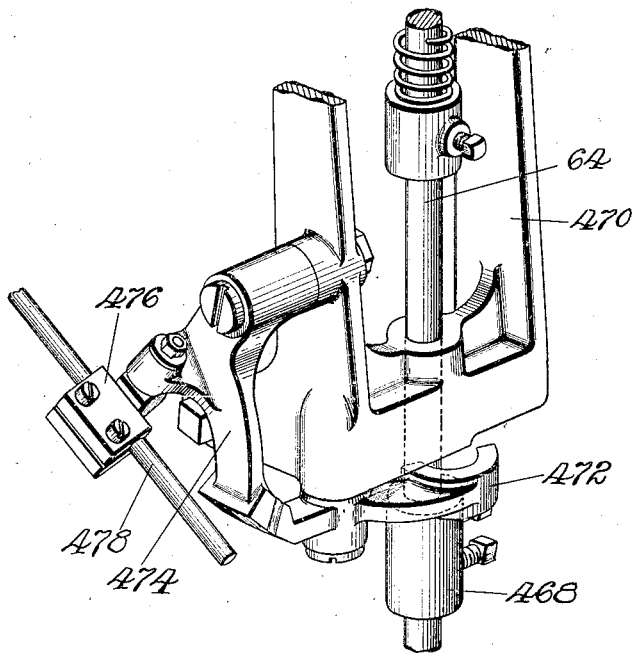

Since it is important, in order to avoid danger of breakage of parts, that the wiper head remain stationary during the operation of the transferring mechanism, the machine is provided with additional controlling means whereby starting of the machine is prevented until after the binder transferring mechanism has been returned to its starting position. The purpose of such control is particularly to avoid such an accident as might result from starting the machine a number of times in rapid succession in the absence of work, as is sometimes done in order to determine whether the tack supplying mechanism is working properly. For the purpose in view there is secured to the treadle rod 64 a collar 468 (Figs. 1 and 18), and pivotally mounted on a bracket 470 on the supporting standard is a locking member 472 one end of which is so shaped as partially to embrace the rod 64 above the collar 468. The member 472 is normally held in an idle position away from the rod 64, as indicated in Fig. 18, but is moved into operative position above the collar to prevent upward movement of the rod upon the actuation of the clutch 200, 202 for initiating the operation of the different mechanisms which are driven through this clutch. For effecting such movement of the member 472 the latter is connected by gear teeth to an arm 474 which is pivoted on the bracket 470 and has swiveled thereon a clamp member 476 secured to a rod 478. At its upper end the rod 478 is connected to a block 480 swiveled in a bracket 482 which is mounted to turn on one end portion of the shaft 318. Also swiveled on the bracket 482 is a block 484 (Fig. 3) which has sliding connection with a pin 486 fast on a clamp 488 secured to the rod 232 which, as explained, is part of the means for moving the clutch member 202 toward the member 200. It will be evident that upon movement of the rod 232 in the direction to actuate the clutch the bracket 482 is turned through the connections described and through the rod 478 and its connected parts serves to swing the locking member 472 inwardly over the top of the collar 468. Movement of the rod 64 in the direction to start the machine is thus prevented until such time as the member 472 is withdrawn from operative position through reverse movement of the rod 232 when the clutch member 202 is returned to its idle position.

Having described the invention, what I claim as new and desire to secure by Letters Patent of the United States is:—

1. In a machine of the class described, the combination with means for applying a binder round the end of a shoe to hold the upper in lasted position, of means for forming a binder and for transferring the binder thus formed into position to be applied to a shoe by said binder applying means.

2. In a machine of the class described, the combination with means for applying a binder round the end of a shoe to hold the upper in lasted position, of mechanism for preparing a binder for use on a shoe, and additional mechanism mounted for movement to transfer the binder thus prepared to the binder applying means.

3. In a machine of the class described, the combination with means for applying a binder round the end of a shoe to hold the upper in lasted position, of power operated means automatically operative in time relation to said binder applying means to prepare a binder for use on a shoe and to transfer the binder thus prepared to the binder applying means.

4. In a machine of the class described, the combination with means for applying a binder round the end of a shoe to hold the upper in lasted position, of mechanism for forming a binder for use on a shoe, mechanism for transferring the binder thus formed into position to be operated upon by said binder applying means, and power driven operating means for imparting operative movements to said different mechanisms in time relation.

5. In a machine of the class described, the combination with end lasting mechanism having means for applying a binder round the end of a shoe, of power operated mechanism for preparing a binder for use on a shoe, and additional means for transferring the binder thus prepared to the binder applying means.

6. In a machine of the class described, the combination with end lasting mechanism having means for applying a binder round the end of a shoe, of means automatically operative in time relation to the operation of said lasting mechanism on a shoe to form a binder and to transfer it from forming position into position to be operated upon by said binder applying means in lasting the next shoe.

7. In a machine of the class described, the combination with end lasting mechanism having means for applying a binder round the end of a shoe, of power operated means for preparing a binder for use on a shoe, controlling mechanism arranged to be operated in time relation to the movement of the lasting mechanism to start said power operated means, and additional power operated means for transferring the binder to the binder applying means.

8. In a machine of the class described, the combination with end lasting mechanism having means for applying a binder round the end of a shoe, of means for forming a binder for attachment to a shoe, and power operated mechanism arranged to be actuated in time relation to the operation of said lasting mechanism on a shoe to transfer the binder thus formed to said binder applying means upon the return of said last named means to starting position following its operation on a shoe.

9. In a machine of the class described, the combination with end lasting mechanism mounted for movement toward and from a shoe and having means for applying a binder round the end of the shoe, of mechanism for forming a binder, mechanism for transferring the binder thus formed into position to be operated upon by said binder applying means, and clutch means arranged to be actuated in time relation to the operation of said lasting mechanism to initiate the operation of said binder forming and transferring mechanisms.

10. In a machine of the class described, the combination with end lasting mechanism having means for applying a binder round the end of a shoe, of mechanism for forming a binder, mechanism for transferring the binder thus formed to the binder applying means, and power driven means automatically controlled in time relation to said lasting mechanism for imparting operative movements to said binder forming and transferring mechanisms.

11. In a machine of the class described, means for pulling an upper over a last, mechanism for lasting the toe end portion of the shoe including means for applying a binder round the end of the shoe, and mechanism automatically operative in time relation to said lasting mechanism to form a binder and to transfer the binder from forming position into position to be applied to a shoe by the binder applying means.

12. In a machine of the class described, power operated means for pulling an upper over a last constructed to come automatically to rest with the upper held under tension, power operated lasting means operative upon a subsequent starting of the machine to wipe the upper round the toe end of the shoe into lasted position and to apply a binder round the end of the shoe, and power operated mechanism automatically operative in time relation to said lasting means for forming a binder and for transferring the binder thus formed to the lasting means after the lasting of a shoe for use in lasting the next succeeding shoe.

13. In a machine of the class described, grippers for engaging an upper on a last, toe lasting mechanism having means for applying a binder round the toe end of the shoe, power operated means for imparting operative movements to said grippers and lasting mechanism, and additional power operated mechanism arranged to be actuated in time relation to the operation of the lasting mechanism to form a binder and to transfer the binder thus formed to the lasting mechanism.

14. In a machine of the class described, means for pulling an upper over a last, mechanism for lasting the toe end of the shoe including means for applying a binder round the end of the shoe, said lasting mechanism being mounted for movement toward and from the shoe, and mechanism mounted independently of said lasting mechanism for presenting a binder to said lasting mechanism for use in the lasting operation.

15. In a machine of the class described, means for pulling an upper over a last, toe lasting mechanism having means for applying a binder round the end of the shoe and mounted for movement toward and from the shoe, mechanism mounted independently of said lasting mechanism for carrying a binder to the lasting mechanism, and power operated means for imparting operative movement to said binder carrying mechanism in time relation to the lasting mechanism.

16. In a machine of the class described, means for pulling an upper over a last, toe lasting mechanism having means for applying a binder round the end of the shoe, and power operated means for presenting to said lasting mechanism a binder previously prepared for use on a shoe.

17. In a machine of the class described, means for pulling an upper over a last, toe lasting mechanism having means for applying round the end of the shoe a binder having anchoring prongs on its ends and for forcing said prongs into the shoe, mechanism for severing a section of binder material and for bending its ends to form anchoring prongs, and additional mechanism mounted for movement to transfer the binder thus formed to the binder applying means.

18. In a machine of the class described, means for pulling an upper over a last, toe lasting mechanism having means for applying round the end of the shoe a binder having anchoring prongs on its ends and for forcing said prongs into the shoe, and power driven mechanism automatically operative in time relation to the lasting mechanism to form a binder with anchoring prongs and to transfer the binder thus formed to the binder applying means.

19. In a machine of the class described, the combination with binder applying means mounted for movement toward and from a shoe, of mechanism supported and operated independently of said movable binder applying means for preparing a binder for use on the shoe.

20. In a machine of the class described, the combination with binder applying means mounted for movement toward and from a shoe, of power operated mechanism supported independently of said binder applying means for preparing a binder for use on a shoe, and controlling means for initiating the operation of said binder preparing mechanism in time relation to the operation of the binder applying means.

21. In a machine of the class described, the combination with end lasting mechanism mounted for movement toward and from a shoe and having means for applying a binder round the end of the shoe, of power operated mechanism supported independently of said lasting mechanism for forming a binder for attachment to the shoe, and clutch means arranged to be actuated in time relation to the operation of said lasting mechanism to initiate the operation of said binder forming mechanism.

22. In a machine of the class described, the combination with end lasting mechanism comprising a wiper head mounted for movement lengthwise of a shoe and having means for applying a binder round the end of the shoe, of mechanism supported independently of said wiper head and operative independently of the end lasting mechanism for forming a binder for use on the shoe.

23. In a machine of the class described, the combination with end lasting mechanism comprising a wiper head mounted for movement lengthwise of a shoe and having means for applying a binder round the end of the shoe, of mechanism supported independently of said wiper head for forming a binder for use on the shoe, and means movable to transfer the binder thus formed to said wiper head.

24. In a machine of the class described, the combination with end lasting mechanism mounted for movement toward and from a shoe and having means for applying a binder round the end of the shoe, of power operated mechanism supported independently of said lasting mechanism for forming a binder for attachment to the shoe, and mechanism for transferring the binder from said forming mechanism into position to be operated upon by said binder applying means.

25. In a machine of the class described, the combination with end lasting mechanism mounted for movement toward and from a shoe and having means for applying a binder round the end of the shoe, of mechanism supported independently of said lasting mechanism for forming a binder for attachment to a shoe, and power operated mechanism arranged to be actuated in time relation to said lasting mechanism to transfer a binder from the forming mechanism to the binder applying means upon return of said last named means to its starting position following its operation on a shoe.

26. In a machine of the class described, the combination with end lasting mechanism mounted for movement toward and from a shoe and having means for applying a binder round the end of the shoe, of power operated binder forming mechanism supported independently of said lasting mechanism, power operated mechanism for transferring a binder from the forming mechanism to the binder applying means, and clutch means arranged to be actuated upon movement of said lasting mechanism away from a shoe to initiate the operation of said binder forming and transferring mechanisms.

27. In a machine of the class described, the combination with end lasting mechanism mounted for movement toward and from a shoe and having means for applying a binder round the end of the shoe, of mechanism supported independently of said lasting mechanism for preparing a binder for use on a shoe and for transferring the binder thus prepared to the lasting mechanism.

28. In a machine of the class described, the combination with means for applying a binder round the end of a shoe to hold the upper in lasted position, of means for advancing a strand of binder material and for severing a section of said material of suitable length for a binder, and means for transferring the severed section of material into position to be applied to a shoe by said binder applying means.

29. In a machine of the class described, the combination with binder applying means mounted for movement toward and from a shoe, of power operated means supported independently of said movable binder applying means for advancing a strand of binder material and for severing a section of said material of suitable length for a binder, and additional power operated means for transferring the severed section of material into position to be operated upon by the binder applying means.

30. In a machine of the class described, the combination with end lasting mechanism having means for applying a binder round the end of a shoe, of means arranged to be operated in time relation to the operation of said lasting mechanism on a shoe to advance and to sever a section of binder material and to transfer the severed section of material to said binder applying means for use in lasting the next shoe.

31. In a machine of the class described, the combination with end lasting mechanism mounted for movement toward and from a shoe and having means for applying a binder round the end of the shoe, of power operated means supported independently of said lasting mechanism for feeding and severing a section of binder material, clutch means arranged to be actuated upon movement of said lasting mechanism away from a shoe to initiate the operation of said feeding and severing means, and additional means automatically operative in time relation to said feeding and severing means to transfer the severed section of material to the binder applying means.

32. In a machine of the class described, the combination with means for applying a binder round the end of a shoe to hold the upper in lasted position, of mechanism for feeding a strand of binder material, a clutch arranged to be actuated in time relation to the operation of said binder applying means to initiate the operation of said feeding mechanism, means for forming a binder from said material and for transferring it to the binder applying means, and additional clutch means arranged to be actuated in time relation to the operation of said feeding means for initiating the operation of the binder forming and transferring means.

33. In a machine of the class described, the combination with means for applying a binder round the end of a shoe to hold the upper in lasted position, of mechanism for feeding a strand of binder material, a clutch arranged to be actuated in time relation to the operation of said binder applying means to initiate the operation of said feeding mechanism, means for forming a binder from said material and for transferring it to the binder applying means, and an additional clutch controlled by the mechanism driven by said first named clutch for initiating the operation of the binder forming and transferring means.

34. In a machine of the class described, the combination with means for applying a binder round the end of a shoe to hold the upper in lasted position, of means for bending the ends of a section of binder material to form a binder with projecting prongs to be forced into the shoe by said binder applying means, and means for transferring the binder thus formed to the binder applying means.

35. In a machine of the class described, the combination with means for applying a binder round the end of a shoe to hold the upper in lasted position, of mechanism for severing from a strand of binder material a section of suitable length for a binder and for bending the ends of said section to provide prongs to be forced into the shoe by the binder applying means, mechanism for transferring the binder thus formed to the binder applying means, and power driven operating means for imparting operative movements to said different mechanisms in time relation.

36. In a machine of the class described, the combination with end lasting mechanism mounted for movement toward and from a shoe and having means for applying a binder round the end of the shoe, of mechanism supported independently of said lasting mechanism for bending the ends of a section of binder material to form a binder for attachment to the shoe, and mechanism for transferring the binder from forming position into position to be operated upon by said binder applying means.

37. In a machine of the class described, the combination with end lasting mechanism mounted for movement toward and from a shoe and having means for applying a binder round the end of the shoe, of power operated mechanism supported independently of said lasting mechanism for bending the ends of a section of binder material to form a binder for attachment to a shoe, mechanism for transferring the binder thus formed to the binder applying means, and clutch means arranged to be actuated in time relation to the operation of the lasting mechanism to initiate the operations of said binder forming and transferring mechanisms.

38. In a machine of the class described, the combination with means for applying a binder round the end of a shoe to hold the upper in lasted position, of mechanism for preparing a binder for use on a shoe, and a support for the binder thus prepared, said support and the binder applying means being relatively movable to effect a presentation of the binder adjacent to the binder applying means.

39. In a machine of the class described, the combination with means for applying a binder round the end of a shoe to hold the upper in lasted position, of mechanism for preparing a binder for use on a shoe, a support for the binder thus prepared, said support and the binder applying means being relatively movable to effect a presentation of the binder adjacent to the binder applying means, and a device movable to withdraw the binder from said support and present it in position to be operated upon by the binder applying means.

40. In a machine of the class described, the combination with means for applying a binder round the end of a shoe, of mechanism for preparing a binder for use on a shoe, and a carrier for receiving the binder from said binder preparing mechanism and for presenting it adjacent to the binder applying means.

41. In a machine of the class described, the combination with means for applying a binder round the end of a shoe, of mechanism for forming a binder for use on a shoe, a carrier mounted for movement from said forming mechanism into proximity to the binder applying means to transfer the binder, and power driven means for imparting operative movement to said carrier.

42. In a machine of the class described, the combination with means for applying a binder round the end of a shoe to hold the upper in lasted position, of means for forming a binder, and means for transferring the binder from the forming means comprising a carrier to receive the binder from the forming means and carry it toward the binder applying means, and a device for withdrawing the binder from said carrier and for presenting it in position to be operated upon by the binder applying means.

43. In a machine of the class described, the combination with means for applying a binder round the end of a shoe to hold the upper in lasted position, of means for forming a binder, a carrier adapted to receive the binder from the forming means and to present it adjacent to the binder applying means, and mechanism automatically operative as the binder is thus presented to withdraw it from the carrier and position it in operative relation to the binder applying means.

44. In a machine of the class described, the combination with means for applying a binder round the end of a shoe to hold the upper in lasted position, of means for feeding a strand of binder material and for severing a section of said material of suitable length for a binder, a carrier arranged to receive the severed section of material and movable into proximity to the binder applying means, and a device for withdrawing the section of material from said carrier and presenting it to the binder applying means.

45. In a machine of the class described, the combination with end lasting mechanism mounted for movement toward and from a shoe and having means for applying a binder round the end of the shoe, of means supported independently of said lasting mechanism for feeding and for severing a section of binder material of suitable length for a binder, a carrier also supported independently of said lasting mechanism and movable to carry the section of material toward the lasting mechanism, and a device carried by the lasting mechanism for withdrawing the section of material from said carrier and presenting it to the binder applying means.

46. In a machine of the class described, the combination with end lasting mechanism mounted for movement toward and from a shoe and having means for applying a binder round the end of the shoe, of mechanism supported independently of said lasting mechanism for forming a binder, a carrier movable to carry the binder from the forming mechanism toward the lasting mechanism, a transferring device carried by the lasting mechanism for withdrawing the binder from said carrier and presenting it to the binder applying means, and power operated means for imparting operative movements to said carrier and transferring device in time relation to present a binder to the binder applying means upon the return of said lasting means to inoperative position following its operation upon a shoe.

47. In a machine of the class described, the combination with end lasting mechanism mounted for movement toward and from a shoe and having means for applying a binder round the end of the shoe, of mechanism supported independently of said lasting mechanism for forming a binder, a carrier movable to carry the binder from the forming mechanism toward the lasting mechanism, and a gripper movable to grip the binder on said carrier and to present it to the binder applying means.

48. In a machine of the class described, the combination with end lasting mechanism mounted for movement toward and from a shoe and having means for applying a binder round the end of the shoe, of mechanism supported independently of said lasting mechanism for forming a binder, a carrier movable to carry the binder from the forming mechanism toward the lasting mechanism, a gripper carried by said lasting mechanism for gripping the binder on said carrier and presenting it to the binder applying means, and power operated means for imparting operative movement to said gripper.

49. In a machine of the class described, the combination with end lasting wiper mechanism having means for applying a binder round the end of a shoe, of means for preparing a binder for use on a shoe, a carrier for the binder mounted for movement to a position substantially in front of the lasting mechanism, and a device for withdrawing the binder from said carrier and presenting it to the binder applying means.

50. In a machine of the class described, the combination with means for applying a binder round the end of a shoe, of binder forming mechanism, means for transferring a binder from the forming mechanism to the binder applying means comprising a carrier arranged to receive the binder from the forming mechanism, and means for effecting discharge of the binder from the forming mechanism.

51. In a machine of the class described, the combination with means for applying a binder round the end of a shoe, of binder forming mechanism comprising an anvil plate and means for bending a section of binder material over said plate to form a binder, means for retracting the anvil plate to discharge the binder, and a carrier arranged to receive the binder and having a part to engage the binder and hold it against retractive movement with the anvil plate.

52. In a machine of the class described, the combination with means for applying a binder round the end of a shoe, of binder forming mechanism comprising an anvil plate and a member for guiding a strand of binder material along said plate, means for transferring a binder from the forming mechanism to the binder applying means comprising a carrier arranged to receive the binder from the forming mechanism, and means for effecting relative movement of said anvil plate and guiding member to discharge the binder from the forming mechanism.

53. In a machine of the class described, the combination with means for applying a binder round the end of a shoe, of binder forming mechanism comprising an anvil plate and means for bending the ends of a section of binder material over said plate to form a binder, means for transferring the binder from the forming mechanism to the binder applying means comprising a carrier arranged to receive the binder from the forming mechanism, and means for retracting the anvil plate to discharge the binder from the forming mechanism, said carrier having parts arranged to engage the end portions of the binder to hold the binder against retractive movement with the anvil plate.

54. In a machine of the class described, the combination with means for applying a binder round the end of a shoe, of binder forming mechanism comprising an anvil plate and means for bending the ends of a section of binder material over the ends of said plate to form a binder, means for transferring the binder from the forming mechanism to the binder applying means comprising a carrier arranged to receive the binder from the forming mechanism, and means for effecting a retractive movement of the anvil plate to release the binder, said carrier having portions arranged to project along the end faces of the anvil plate to restrain the binder from retractive movement with said plate.

55. In a machine of the class described, the combination with means for applying a binder round the end of a shoe, of binder forming mechanism, means for transferring a binder from said forming mechanism to the binder applying means comprising a carrier arranged to receive the binder from the forming mechanism, and means for effecting relative movement of parts of said forming mechanism to discharge the binder, said carrier having parts arranged to engage the opposite end portions of the binder to assist in effecting such discharge of the binder.

56. In a machine of the class described, the combination with means for applying a binder round the end of a shoe, of binder forming mechanism comprising an anvil plate, means for feeding a strand of binder material into operative relation to said anvil plate, means for transferring a binder from the forming mechanism to the binder applying means comprising a carrier having parts arranged to be positioned adjacent to the path of feeding movement of the binder material during the advance of said material, and means for effecting relative movement between said parts of the carrier and the anvil plate to effect discharge of the binder from the forming mechanism.

57. In a machine of the class described, the combination with means for applying a binder round the end of a shoe, of binder forming mechanism comprising an anvil plate and a member for guiding a strand of binder material along said plate, means for transferring the binder from said forming mechanism to the binder applying means comprising a carrier having parts arranged to be positioned adjacent to said anvil plate beyond the ends of said guide member for engagement with the end portions of the binder, and means for retracting the anvil plate to release the binder after it has been formed, said guide member being arranged to co-operate with said binder engaging parts of the carrier to hold the binder against retractive movement with the anvil plate.

58. In a machine of the class described, the combination with means for applying a binder round the end of a shoe, of binder forming mechanism, and means for transferring a binder from said forming mechanism to the binder applying means comprising a carrier having a guideway to receive the binder from the forming mechanism and an abutment at the end of said guideway to support the binder.

59. In a machine of the class described, the combination with means for applying a binder round the end of a shoe, of binder forming mechanism, and means for transferring a binder from said forming mechanism to the binder applying means comprising a carrier having opposite side portions provided with guideways to receive the binder from the forming mechanism and having at the ends of said guideways abutments for supporting the end portions of the binder.

60. In a machine of the class described, the combination with means for applying a binder round the end of a shoe, of binder forming mechanism constructed to bend the ends of a section of binder material to provide prongs for attachment to the shoe, and means for transferring a binder from said forming mechanism to the binder applying means comprising a carrier having abutments arranged for supporting engagement with the end portions of the binder adjacent to said prongs and provided with openings adjacent to said abutments to receive the prongs.

61. In a machine of the class described, the combination with means for applying a binder round the end of a shoe, of binder forming mechanism comprising an anvil plate, means for transferring a binder from said forming mechanism to the binder applying means comprising a carrier having opposite side portions provided with guideways to receive the binder as it is discharged from the forming mechanism, and means for positioning the anvil plate across said guideways during the forming operation and for subsequently retracting it to discharge the binder into the guideways.

62. In a machine of the class described, the combination with means for applying a binder round the end of a shoe, of binder forming mechanism, a carrier to receive a binder from said forming mechanism and carry it into proximity to the binder applying means, means for effecting relative movement of parts of the forming mechanism to release a binder therefrom, and additional means movable to deliver the binder to said carrier.

63. In a machine of the class described, the combination with means for applying a binder round the end of a shoe, of binder forming mechanism, a carrier to receive a binder from said forming mechanism and carry it into proximity to the binder applying means, said carrier having a guideway for the binder and means at the end of said guideway for supporting the binder, and a pusher device movable along said guideway to deliver the binder to said supporting means.

64. In a machine of the class described, the combination with means for applying a binder round the end of a shoe, of binder forming mechanism comprising an anvil plate, means for transferring a binder from said forming mechanism to the binder applying means comprising a carrier having abutments to support the opposite end portions of the binder and guideways to direct the binder to said abutments, pusher members movable along said guideways, and operating mechanism for withdrawing the anvil plate to discharge a binder therefrom and for moving said pusher members to deliver the binder to said abutments.

65. In a machine of the class described, the combination with means for applying a binder round the end of a shoe, of binder forming mechanism, a carrier arranged to receive a binder from said forming mechanism and movable to carry it into proximity to the binder applying means, said carrier having a pusher device movable to deliver the binder from the forming mechanism to the carrier, and means for imparting operative movement to said pusher device and for holding it substantially at the end of its operative movement during the operative movement of the carrier.

66. In a machine of the class described, the combination with means for applying a binder round the end of a shoe, of binder forming mechanism, and a carrier movable to carry a binder from said forming mechanism into proximity to the binder applying means, said carrier having different guideways disposed at an angle to each other and arranged respectively to receive a binder from the forming mechanism and to direct it to the binder applying means.

67. In a machine of the class described, the combination with means for applying a binder round the end of a shoe, of binder forming mechanism, a carrier movable to carry a binder from the forming mechanism into proximity to the binder applying means, said carrier having diverging guideways arranged respectively to receive a binder from the forming mechanism and to direct it to the binder applying means, a pusher device movable along the receiving guideway to deliver the binder to the carrier, and means for moving said pusher device substantially to the point of divergence between the guideways and for maintaining it at said point to assist in directing the binder to the binder applying means.

68. In a machine of the class described, the combination with means for applying a binder round the end of a shoe, of binder forming mechanism, a carrier movable to carry a binder from the forming mechanism into proximity to the binder applying means, said carrier having diverging guideways arranged respectively to receive a binder from the forming mechanism and to direct it to the binder applying means, and a device for closing said receiving guideway behind the binder to assist in directing the binder along the other guideway.

69. In a machine of the class described, the combination with means for applying a binder round the end of a shoe, of binder forming mechanism, a carrier movable to carry a binder from the forming mechanism into proximity to the binder applying means, said carrier having opposite side portions provided with diverging guideways arranged respectively to receive a binder from the forming mechanism and to direct it to the binder applying means, a pusher device having opposite side portions slidable along said receiving guideways, and means for imparting operative movement to said pusher device and for holding it in position to close the receiving guideways adjacent to the points of divergence between the guideways.

70. In a machine of the class described, the combination with end lasting mechanism having means for applying a binder round the end of a shoe, of mechanism arranged to receive a binder in a position remote from said lasting mechanism and movable to carry the binder to the lasting mechanism.

71. In a machine of the class described, the combination with end lasting wipers, and means adjacent to said wipers for applying a binder round the end of a shoe, of a binder conveying device mounted for movement in a direction transverse to the plane of said wipers to carry a binder into proximity to the binder applying means.

72. In a machine of the class described, the combination with end lasting mechanism having means for applying a binder round the end of a shoe, and means for imparting operative movement to said lasting mechanism, of mechanism automatically operative in time relation to the lasting mechanism to carry a severed section of binder material to the lasting mechanism.

73. In a machine of the class described, the combination with end lasting mechanism having means for applying a binder round the end of a shoe, of means movably mounted to engage a binder previously formed of proper length for use on a shoe and to present the binder in position to be operated upon by the binder applying means.

74. In a machine of the class described, the combination with end lasting mechanism having means for applying a binder round the end of a shoe, of power operated mechanism automatically operative in time relation to said lasting mechanism to convey to the binder applying means a binder prepared for use on a shoe.

75. In a machine of the class described, the combination with means for applying round the end of a shoe a binder having prongs on its ends and for forcing its prongs into the shoe, of power operated mechanism for conveying a binder so formed to said binder applying means and for presenting it in position to be operated upon by the binder applying means.

76. In a machine of the class described, the combination with end lasting mechanism mounted for movement toward and from a shoe and having means for applying a binder round the end of the shoe, of power operated mechanism arranged to be actuated in time relation to the movement of said lasting mechanism away from a shoe to convey to said lasting mechanism a binder prepared for attachment to a shoe and present it in position to be operated upon by the binder applying means in lasting the next shoe.

77. In a machine of the class described, the combination with end lasting mechanism having means for applying a binder round the end of a shoe to hold the upper in lasted position, of means for presenting a binder to said lasting mechanism comprising a carrier movable toward and from said mechanism, and means for delivering a binder to said carrier.

78. In a machine of the class described, the combination with means for applying a binder round the end of a shoe to hold the upper in lasted position, of a support for a binder prepared for use on a shoe, said support and the binder applying means being relatively movable to effect the presentation of a binder adjacent to said means.

79. In a machine of the class described, the combination with end lasting mechanism mounted for movement toward and from a shoe and having means for applying a binder round the end of the shoe, of a carrier supported independently of said lasting mechanism and constructed to hold a severed section of binder material, said carrier being mounted for movement to carry said section of material to the lasting mechanism.

80. In a machine of the class described, the combination with end lasting mechanism mounted for movement toward and from a shoe and having means for applying a binder round the end of the shoe, of a carrier supported independently of said lasting mechanism and constructed to hold a binder provided with prongs on its ends for attachment to a shoe, said carrier being mounted for movement toward and from the lasting mechanism, and power operated means for moving said said carrier to the lasting mechanism.

81. In a machine of the class described, the combination with end lasting mechanism having means for applying a binder round the end of a shoe and provided with an opening to receive a binder, of a carrier movable to convey a binder to said lasting mechanism and provided with a delivery slot arranged to aline with said opening in the lasting mechanism.

82. In a machine of the class described, the combination with end lasting mechanism comprising wiper plates and shoe end embracing plates spaced from said wiper plates to provide an opening for a binder between the respective plates, of a carrier movable to convey a binder to said lasting mechanism and arranged to present a binder in the plane of said binder receiving opening.

83. In a machine of the class described, the combination with end lasting mechanism having means for applying a binder round the end of a shoe, of a carrier adapted to support a binder prepared for use on a shoe and to present the binder to the lasting mechanism, said carrier and the lasting mechanism being constructed for co-operative engagement to determine the proper relation between them for presentation of the binder.

84. In a machine of the class described, the combination with end lasting mechanism having means for applying a binder round the end of a shoe, of a carrier adapted to support a binder prepared for use on a shoe and to convey said binder to the lasting mechanism, said lasting mechanism and the carrier being relatively constructed and arranged for presenting different binders invariably in the same relation to said mechanism.

85. In a machine of the class described, the combination with end lasting mechanism having means for applying a binder round the end of a shoe, of a carrier adapted to support a binder prepared for use on a shoe and movable to convey said binder to the lasting mechanism, said carrier and the lasting mechanism being relatively constructed and arranged to determine the position of presentation of the binder by the position of said mechanism.

86. In a machine of the class described, the combination with end lasting mechanism having means for applying a binder round the end of a shoe, of a carrier movable to convey a binder to said lasting mechanism, said carrier and the lasting mechanism being arranged for engagement with each other to limit the movement of the carrier and determine its relation to the lasting mechanism.

87. In a machine of the class described, the combination with end lasting mechanism comprising wipers and means associated with said wipers for applying a binder round the end of a shoe, of a carrier mounted for movement in a direction transverse to the plane of said wipers to convey a binder to the lasting mechanism, the lasting mechanism being arranged to engage the carrier to limit the movement of the carrier and determine its relation to the binder applying means.

88. In a machine of the class described, the combination with end lasting mechanism having means for applying a binder round the end of a shoe, of a carrier movable to convey a binder to said lasting mechanism, and yieldable means for imparting operative movement to said carrier, the lasting mechanism being arranged to engage said carrier to limit the movement of the carrier.

89. In a machine of the class described, the combination with end lasting mechanism having means for applying a binder round the end of a shoe, of a carrier movable to convey a binder to said lasting mechanism, spring means for imparting operative movement to said carrier, and a cam for controlling the movement of the carrier.

90. In a machine of the class described, the combination with end lasting mechanism comprising wiper plates and shoe end embracing plates spaced from said wiper plates to provide an opening to receive a binder, of a carrier mounted for swinging movement to convey a binder to said lasting mechanism and provided with a guideway for the binder arranged to aline with said opening, and yieldable means for swinging said carrier toward the lasting mechanism, said end embracing plates being arranged to engage the carrier to limit its movement and insure alinement of said guideway with the binder receiving opening.

91. In a machine of the class described, the combination with end lasting mechanism having means for applying a binder round the end of a shoe and adjustable about an axis extending laterally of the shoe, of a carrier for conveying a binder to said lasting mechanism, said carrier being mounted for operative swinging movement about an axis substantially co-incident with the axis about which said lasting mechanism is adjustable.

92. In a machine of the class described, the combination with end lasting mechanism having means for applying a binder round the end of a shoe and adjustable about an axis extending laterally of the shoe, of a carrier for conveying a binder to said lasting mechanism, said carrier being mounted for operative swinging movement about an axis substantially co-incident with the axis about which said lasting mechanism is adjustable, yieldable means for swinging said carrier toward the lasting mechanism, and means for limiting movement of the carrier by engagement with the lasting mechanism.

93. In a machine of the class described, the combination with end lasting mechanism having means for applying a binder round the end of a shoe and adjustable about an axis extending laterally of the shoe, of a carrier for conveying a binder to said lasting mechanism, said carrier being mounted to swing about an axis substantially co-incident with the axis of adjustment of the lasting mechanism to a limit of movement determined by engagement with the lasting mechanism, spring means for imparting said movement to the carrier, and cam means for controlling the movement of the carrier to permit it to be swung into operative relation to the lasting mechanism in any position of adjustment of said mechanism.

94. In a machine of the class described, the combination with end lasting mechanism having means for applying a binder round the end of a shoe and adjustable to different positions, of a carrier for conveying a binder to said lasting mechanism, and means for moving said carrier invariably into the same relation to the lasting mechanism irrespective of the adjustment of said mechanism.

95. In a machine of the class described, the combination with means for applying a binder round the end of a shoe, of means movable to carry a binder into proximity to said binder applying means, and additional means for withdrawing the binder from said carrying means and presenting it in position to be operated upon by the binder applying means.

96. In a machine of the class described, the combination with means for applying a binder round the end of a shoe, of a carrier movable to convey a binder into proximity to said binder applying means, a transferring device for withdrawing the binder from said carrier and presenting it to the binder applying means, and power operated mechanism for imparting operative movements to said carrier and transferring device.

97. In a machine of the class described, the combination with end lasting mechanism mounted for movement toward and from a shoe and having means for applying a binder round the end of the shoe, of a carrier mounted independently of said lasting mechanism for movement to convey a binder to said mechanism, and a device carried by said lasting mechanism and movable relatively thereto to withdraw the binder from said carrier and present it to the binder applying means.

98. In a machine of the class described, the combination with end lasting mechanism mounted for movement toward and from a shoe and having means for applying a binder round the end of the shoe, of a carrier mounted independently of said lasting mechanism for movement to convey a binder to said mechanism, power operated means timed to impart operative movement to said carrier to present a binder adjacent to the lasting mechanism after said mechanism has returned to its starting position following its operation on a shoe, and a device automatically operative in time relation to said carrier to withdraw the binder from the carrier and present it in position to be operated upon by the binder applying means.

99. In a machine of the class described, the combination with end embracing wipers and means associated with said wipers for applying a binder round the end of a shoe, of a carrier movable to convey into proximity to said binder applying means a binder prepared for use on a shoe, and a device mounted on the lasting mechanism substantially midway between the opposite sides of said mechanism for movement to withdraw the binder from said carrier and present it to the binder applying means.

100. In a machine of the class described, the combination with end lasting mechanism comprising wiper plates and shoe end embracing plates spaced from the wiper plates to provide a binder receiving opening, of a carrier movable to convey a binder to said lasting mechanism and having binder guiding slots arranged to aline with said opening, and a device movable substantially along the longitudinal median line of said wiper mechanism to withdraw a binder from the carrier into said opening.

101. In a machine of the class described, the combination with means for applying a binder round the end of a shoe, of a carrier movable to convey a binder into proximity to said binder applying means, said carrier being constructed to support the end portions of the binder and to leave the intermediate portion of the binder unobstructed, and a device arranged to engage the binder substantially midway between its opposite ends and to transfer it from said carrier into position to be operated upon by the binder applying means.

102. In a machine of the class described, the combination with means for applying round the end of a shoe a binder having angled ends and for forcing the ends of the binder into the shoe, of a carrier constructed for supporting engagement with the end portions of a binder so formed and movable to carry the binder into proximity to the binder applying means, and a device arranged to engage the binder substantially midway between its opposite ends and movable to withdraw the binder from said carrier and present it in position to be operated upon by the binder applying means.

103. In a machine of the class described, the combination with end lasting mechanism having means for applying a binder round the end of a shoe, of a support for a binder constructed to engage the opposite end portions of the binder while leaving its intermediate portion unobstructed, and a device movable to engage said intermediate portion of the binder and to transfer the binder from said support to the binder applying means.

104. In a machine of the class described, the combination with means for applying a binder round the end of a shoe, of means for presenting a binder in proximity to said binder applying means, and a device movably mounted to engage the binder as thus presented and to carry it from the presenting means into position to be operated upon by the binder applying means.

105. In a machine of the class described, the combination with end lasting wiper plates and shoe end embracing plates spaced from said wiper plates to provide an opening to receive a binder, of means for presenting a binder substantially in the plane of said opening, and a device movable to engage the binder as thus presented and to carry it into said opening.

106. In a machine of the class described, the combination with binder applying means constructed to extend round the end of a shoe, of a member movable in a plane substantially perpendicular to the plane of the shoe bottom for engaging a binder substantially midway between its opposite ends and for bending it into place against said binder applying means.

107. In a machine of the class described, the combination with end lasting mechanism comprising wipers and end embracing plates movably mounted and provided with curved edges for applying a binder round the end of a shoe, of means for engaging binder material and bending it into place against the edges of said plates preparatory to the operative movement of the plates.

108. In a machine of the class described, the combination with end lasting mechanism having means for working an upper into lasted position and plates movable relatively to said means and provided with curved edges for applying a binder round the end of a shoe, of means for supporting substantially in the plane of said binder applying plates a binder extending substantially straight between its opposite end portions, and a device for engaging the binder substantially midway between its opposite ends and for forcing it against the curved edges of said plates into position to be applied to the shoe by the movement of the plates.

109. In a machine of the class described, the combination with means for applying a binder round the end of a shoe, of a carrier mounted for movement to convey a binder into proximity to said binder applying means, a gripper movable to grip a binder on said carrier and to present it in position to be operated upon by the binder applying means, and power operated means for imparting operative movements to said carrier and gripper in time relation.

110. In a machine of the class described, the combination with means for applying a binder round the end of a shoe, of a carrier movable to convey a binder into proximity to said binder applying means, a gripper mounted for movement toward a binder presented by said carrier, and means for moving said gripper toward the binder and for closing it upon the binder and for subsequently retracting it to draw the binder into position to be operated upon by the binder applying means.

111. In a machine of the class described, the combination with end lasting mechanism comprising wiper plates and shoe end embracing plates spaced from said wiper plates to provide an opening for a binder, of a binder presenting device having slots arranged to aline with said opening, and a gripper mounted for movement to grip a binder presented by said device and to force the binder into said opening.

112. In a machine of the class described, the combination with means for applying a binder round the end of a shoe, of means for supporting a binder prepared for use on a shoe, and a gripper mounted for movement to grip a binder as thus supported and to present it to the binder applying means.

113. In a machine of the class described, the combination with end lasting mechanism having means for applying a binder round the end of a shoe, of means for supporting a binder prepared for use on a a shoe, and a gripper mounted on said lasting mechanism and movable to transfer a binder from said supporting means to the binder applying means.

114. In a machine of the class described, the combination with means for applying a binder round the end of a shoe, of means for supporting a binder prepared for use on a shoe, a gripper mounted for movement toward a binder as thus supported and for reverse movement to present the binder to the binder applying means, and mechanism automatically operative in time relation to the movement of the gripper to close it upon the binder and subsequently to open it and release the binder.

115. In a machine of the class described, the combination with means for applying a binder round the end of a shoe, of means for supporting a binder prepared for use on a shoe, a gripper mounted for movement toward a binder as thus supported and for reverse movement to present the binder to the binder applying means, and a device automatically operative to close the gripper on the binder before it begins its reverse movement.

116. In a machine of the class described, the combination with means for applying a binder round the end of a shoe, of means for supporting a binder in proximity to said binder applying means, a gripper comprising relatively movable jaws, operating means for moving said gripper forwardly toward the binder with its jaws in open position and for subsequently moving it in the reverse direction to carry the binder into position to be operated upon by the binder applying means, mechanism automatically operative prior to such reverse movement of the gripper to close the jaws on the binder, and means for subsequently opening the jaws to release the binder.

117. In a machine of the class described, the combination with means for applying a binder round the end of a shoe, of means for supporting a binder in proximity to said binder applying means, a gripper comprising relatively movable jaws for gripping a binder as thus supported and for carrying it into position to be operated upon by the binder applying means, operating means for moving said gripper toward the binder and for subsequently moving it in the reverse direction to carry the binder to the binder applying means, mechanism automatically operative in said reverse movement of the gripper to hold the jaws closed upon the binder, and a device arranged to operate said mechanism as the gripper nears the end of its operative movement to cause the jaws to release the binder.

118. In a machine of the class described, the combination with means for applying a binder round the end of a shoe, of means for supporting a binder in proximity to said binder applying means, a gripper comprising a pair of jaws one of which is movable toward the other for gripping the binder as thus supported, operating mechanism for moving the gripper to carry the binder to the binder applying means, and a device arranged to be operated under control of said mechanism for imparting gripping movement to said movable jaw prior to the operative movement of said jaws.

119. In a machine of the class described, the combination with means for applying a binder round the end of a shoe, of means for supporting a binder in proximity to said binder applying means, a gripper comprising a pair of jaws relatively movable to grip the binder and movable together bodily to carry the binder to the binder applying means, jaw closing mechanism, and operating means arranged to be connected to the gripper jaws through said closing mechanism to close the jaws on the binder prior to the operative bodily movement of the jaws.

120. In a machine of the class described, the combination with means for applying a binder round the end of a shoe, of means for presenting a binder in proximity to said binder applying means, a gripper comprising a pair of jaws relatively movable to grip a binder as thus presented, a support for said jaws mounted for movement to carry the binder to the binder applying means, a jaw closing device movable relatively to said support, and operating means arranged to be connected to said support through said closing device for imparting to said device initially a jaw closing movement and for then imparting binder transferring movement to said jaws.

121. In a machine of the class described, the combination with means for applying a binder round the end of a shoe, of means for presenting a binder in proximity to said binder applying means, a gripper comprising a pair of jaws relatively movable to grip a binder as thus presented, a support for said jaws mounted for movement to carry the binder to the binder applying means, jaw closing means comprising a closing slide mounted for limited movement relatively to said support, operating means arranged to be connected to said support through said closing slide, and a spring arranged to act in the initial portion of the movement of said operating means to cause said slide to move relatively to the support for closing the jaws on the binder.

122. In a machine of the class described, the combination with means for applying a binder round the end of a shoe, of means for presenting a binder in proximity to said binder applying means, a gripper comprising a pair of jaws one of which is movable toward the other for gripping a binder as thus presented, a support for said jaws, a closing member mounted on said support for imparting closing movement to said movable jaw, a closing slide movable relatively to said support, a pawl on said slide for engaging said closing member, and operating means connected to said slide for imparting closing movement to said movable jaw and for then imparting binder transferring movement to both the jaws.

123. In a machine of the class described, the combination with means for applying a binder round the end of a shoe, of means for presenting a binder in proximity to said binder applying means, a gripper comprising a pair of relatively movable jaws, a support for said jaws mounted for forward movement toward a binder as thus presented and for reverse movement to carry the binder to the binder applying means, operating means for moving said support forwardly and then reversely, and jaw closing mechanism comprising parts arranged to be connected by the forward movement of said operating means for closing the jaws upon a reverse movement of said means.

124. In a machine of the class described, the combination with means for applying a binder round the end of a shoe, of means for presenting a binder in proximity to said binder applying means, a gripper comprising a pair of relatively movable jaws, a support for said jaws mounted for forward movement toward a binder as thus presented and for reverse movement to carry the binder to the binder applying means, operating means for moving said support forwardly and then reversely, jaw closing mechanism comprising parts arranged to be connected by the forward movement of said operating means for closing the jaws upon a reverse movement of said means, and a device automatically operative in the reverse movement of the jaws to disconnect said parts and permit the jaws to open.

125. In a machine of the class described, the combination with means for applying a binder round the end of a shoe, of means for presenting a binder in proximity to said binder applying means, a gripper comprising a pair of jaws one of which is movable toward the other for gripping a binder as thus presented, a support for said jaws mounted for forward movement to carry them toward the binder and for subsequent reverse movement to carry the binder to the binder applying means, means for limiting said forward movement of the support, a closing member mounted on said support for imparting closing movement to said movable jaw, a closing slide movable relatively to said support, operating means connected to said slide, and a pawl carried by said slide and arranged to be advanced by forward movement of the slide relatively to said support into position to connect the slide to said closing member for closing said movable jaw on the binder through reverse movement of the operating means.

126. In a machine of the class described, the combination with means for applying a binder round the end of a shoe, of means for presenting a binder in proximity to said binder applying means, a gripper comprising a pair of jaws relatively movable to grip a binder as thus presented, a support for said jaws movable to carry the binder to the binder applying means, jaw closing means on said support, operating means connected to said closing means for closing the jaws on the binder and for then moving the jaws together to carry the binder to the binder applying means, and a device automatically operative in said movement of the jaws to operate said closing means and cause the jaws to release the binder.

127. In a machine of the class described, the combination with means for applying a binder round the end of a shoe, of means for presenting a binder in proximity to said binder applying means, a gripper comprising a pair of jaws one of which is movable toward the other for gripping a binder as thus presented, a support for said jaws movable to carry the binder to the binder applying means, a closing member mounted on said support for imparting closing movement to said movable jaw, a closing slide movable relatively to said support, a pawl on said slide for engaging said closing member to operate it, operating means connected to said support through said slide, and a device for operating said pawl at a predetermined point in the binder transferring movement of the jaws to cause it to release said closing member and permit the jaws to open.

128. In a machine of the class described, the combination with means for applying a binder round the end of a shoe, of means for supporting a binder in proximity to said binder applying means, a gripper for engaging a binder as thus supported, means for moving said gripper to carry the binder to the binder applying means, and mechanism automatically operative in said movement of the gripper to open it and release the binder.

129. In a machine of the class described, the combination with means for applying a binder round the end of a shoe, of means for supporting a binder in proximity to said binder applying means, a gripper for engaging a binder as thus supported, a spring against the tension of which said jaws are relatively movable to grip the binder, means for imparting relative closing movement to the jaws and for moving them together to carry the binder to the binder applying means, and a tripping device automatically operative in said movement of the jaws to cause the jaws to open and release the binder.

130. In a machine of the class described, the combination with means for applying a binder round the end of a shoe, of means for supporting a binder in proximity to said binder applying means, a gripper comprising a pair of jaws one of which is movable toward the other for gripping a binder as thus supported, operating mechanism for imparting closing movement to said movable jaw and for moving the jaws together to carry the binder to the binder applying means, said operating mechanism including a pawl through which closing movement is imparted to said movable jaw, and an abutment arranged to engage said pawl at a predetermined point in the binder transferring movement of the gripper to release said movable jaw and permit it to open.

131. In a machine of the class described, the combination with means for applying a binder round the end of a shoe, of means for supporting a binder in proximity to said binder applying means, a gripper comprising a slide mounted for movement toward a binder as thus supported and for movement in the reverse direction to carry the binder to the binder applying means, a gripper jaw on said slide having a gripping face extending lengthwise of the path of movement of the gripper, and a co-operating jaw mounted on said slide for movement toward and from the other jaw in a direction at substantially right angles to said path of movement.

132. In a machine of the class described the combination with end lasting mechanism comprising wiper plates and shoe end embracing plates spaced from said wiper plates to provide an opening to receive a binder, of means for presenting a binder substantially in the plane of said opening, and a device mounted for movement between said end embracing plates to carry the binder into said opening.

133. In a machine of the class described, the combination with end lasting mechanism comprising wiper plates and shoe end embracing plates spaced from said wiper plates to provide an opening to receive a binder, of means for presenting a binder substantially in the plane of said opening, a gripper mounted for movement between said end embracing plates to carry the binder into said opening, and means for imparting operative movement to said gripper and for subsequently withdrawing it to an idle position to permit the operation of the lasting mechanism on the shoe.

134. In a machine of the class described, the combination with means for applying a binder round the end of a shoe, of means for presenting a binder in position to be operated upon by said binder applying means, and means automatically operative after the binder has been thus presented to hold it against displacement in the direction of its length.

135. In a machine of the class described, the combination with means for applying round the end of a shoe a binder having inturned ends and for forcing its ends into the shoe, of means for presenting a binder in position to be operated upon by said binder applying means, and means for engaging the inturned ends of the binder after it has been thus presented to position it against displacement relatively to the binder applying means.

136. In a machine of the class described, the combination with means for applying round the end of a shoe a binder having inturned ends and for forcing its ends into the shoe, of means for moving a binder into position to be operated upon by said binder applying means and for then releasing the binder, and means arranged to engage the outer edges of the inturned ends of the binder to position the binder relatively to the binder applying means when it is thus released.

137. In a machine of the class described, the combination with means for applying round the end of a shoe a binder having inturned ends and for forcing its ends into the shoe, of means for engaging a binder between its opposite end portions and for moving it to said binder applying means, and members past which the ends of the binder are permitted to slip as the binder is moved to operative position, said members being arranged to serve as abutments in engagement with the inturned ends of the binder to position it relatively to the binder applying means.

138. In a machine of the class described the combination with end lasting mechanism having means for applying a binder round the end of a shoe and adapted to receive and position a binder, of retaining means constructed and arranged to hold different binders presented to the binder applying means in an invariable lengthwise position relatively to said means.

139. In a machine of the class described, the combination with end lasting mechanism having means for applying round the end of a shoe a binder provided on its ends with prongs for attachment to the shoe, of retaining means constructed and arranged to engage said prongs for holding the binder against displacement in the direction of its length.

140. In a machine of the class described, the combination with end lasting mechanism having means for applying round the end of a shoe a binder provided on its ends with prongs for attachment to the shoe, of retaining means constructed and arranged to engage said prongs for holding the binder against displacement in the direction of its length, said retaining means being yieldingly mounted to permit its displacement by the operation of the binder applying means.

141. In a machine of the class described, the combination with end lasting wiper plates, shoe end embracing plates spaced from said wiper plates to provide an opening to receive a binder having inturned ends, and driver plates movable in said opening to apply the binder to a shoe, of members arranged to engage the inturned ends of the binder to position it against displacement in said opening.

142. In a machine of the class described, the combination with end lasting wiper plates, shoe end embracing plates spaced from said wiper plates to provide an opening to receive a binder having inturned ends, and driver plates movable in said opening to apply the binder to a shoe, of members arranged to project transversely of said opening for positioning engagement with the inturned ends of the binder, said members being yieldable in response to the pressure of said driver plates to permit the operative movement of said plates.

143. In a machine of the class described, the combination with end lasting wiper plates, shoe end embracing plates spaced from said wiper plates to provide an opening to receive a binder having inturned ends, and driver plates movable in said opening to apply the binder to a shoe, of members arranged to project transversely of said opening and provided with shoulders for engagement with the inturned ends of the binder to determine the position of the binder, said members being yieldably mounted and having beveled faces to be engaged by said driver plates to cause said plates in their operative movement to force the members to an inoperative position.

144. In a machine of the class described, the combination with end lasting wiper plates, shoe end embracing plates spaced from said wiper plates to provide an opening to receive a binder having inturned ends, and driver plates movable in said opening to apply the binder to a shoe, of means for engaging a binder and forcing it into said opening, and members projecting transversely of said opening in position for engagement with the inturned ends of the binder as thus presented to determine the lengthwise position of the binder in said opening.

145. In a machine of the class described, the combination with end lasting wiper plates, shoe end embracing plates spaced from said wiper plates to provide an opening to receive a binder having inturned ends, and driver plates movable in said opening to apply the binder to a shoe, of a gripper for engaging a binder substantially midway between its ends, means for operating said gripper to carry the binder into said opening and then to release the binder, and spring controlled pins arranged to project transversely of said opening and having shoulders for engagement with the inturned ends of the binder when it is released to position it in said opening.

146. In a machine of the class described, the combination with end lasting mechanism having means for applying a binder round the end of a shoe, of means movable to present a binder to said binder applying means, and a device past which the binder is carried in its presenting movement, said device being constructed and arranged to hold the binder against retractive movement.

147. In a machine of the class described, the combination with end lasting mechanism having means for applying a binder round the end of a shoe, of means movable to present a binder to said binder applying means, and members past which the opposite end portions of the binder are permitted to spring as the binder is thus presented, said members being arranged to retain and to position the binder relatively to the binder applying means.

148. In mechanism for preparing lasting binders, the combination with means for feeding a strand of binder material, of an anvil plate along which said material is fed, said plate extending lengthwise a distance equal to the required length of a binder to be applied round the end of a shoe for holding the upper in lasted position, and members for engaging said material and bending it over the ends of said anvil plate to form prongs on the binder to be forced into the shoe.

149. In mechanism for preparing lasting binders, the combination with means for feeding a strand of binder material, of an anvil plate along which said material is fed, said plate extending lengthwise a distance equal to the required length of a binder to be applied round the end of a shoe for holding the upper in lasted position, a member extending along said anvil plate and arranged to co-operate with said plate to guide the material, and members for engaging said material and bending it over the ends of the anvil plate to form prongs on the binder to be forced into a shoe.

150. In mechanism for preparing lasting binders, the combination with means for feeding a strand of binder material, of an anvil plate along which said material is fed, said plate extending lengthwise a distance equal to the required length of a binder to be applied round the end of a shoe for holding the upper in lasted position, a guide member having a groove to direct said material along the anvil plate, means for severing a section of said material and for bending its ends over the ends of the anvil plate, and mechanism for subsequently effecting relative movement of the anvil plate and said guide member to release the binder.

151. In mechanism for preparing lasting binders, the combination with means for feeding a strand of binder material, of an anvil plate along which said material is fed, said plate extending lengthwise a distance equal to the required length of a binder to be applied round the end of a shoe for holding the upper in lasted position, a member extending along said anvil plate and having a groove to guide said material, means for severing a section of said material and for bending its ends over the ends of the anvil plate, and mechanism for subsequently withdrawing the anvil plate laterally of the binder in said groove to release the binder.

152. In mechanism for preparing lasting binders, the combination with binder forming means, of means for feeding a strand of binder material to said forming means comprising a movable feeding member, and an additional member for guiding said material, said guiding member being positioned in advance of the feeding member with provision for relative movement between the two members during a portion only of the operative movement of the feeding member.

153. In mechanism for preparing lasting binders, the combination with binder forming means, of means for feeding a strand of binder material to said forming means comprising a reciprocable feeding member, and an additional member for guiding said material, said guiding member being mounted for reciprocatory movement in advance of the feeding member in position to be moved forwardly with said feeding member during a portion only of the feeding movement.

154. In mechanism for preparing lasting binders, the combination with binder forming means, of means for feeding a strand of binder material into operative relation to said forming means, said feeding means comprising a feeding member having a feeding movement of determinate length, a member for guiding said material, and means for positioning said guiding member normally at a point between the limits of the feeding movement of the feeding member while permitting it to be moved forwardly with the feeding member during a portion of the operative movement of said feeding member.

155. In mechanism for preparing lasting binders, the combination with binder forming means, of means for feeding a strand of binder material into operative relation to said forming means, said feeding means comprising a feeding member having a feeding movement of determinate length, and a member for guiding said material, said guiding member being mounted for movement only between a point substantially midway of the path of movement of the feeding member and a point substantially at the end of said path of movement and arranged to be controlled by movement of the feeding member.

156. In mechanism for preparing lasting binders, the combination with binder forming means, of means for feeding a strand of binder material into operative relation to said forming means, said feeding means comprising a guideway and a feeding member having a determinate length of movement along said guideway, a member also movable along said guideway for guiding said material, and means comprising a spring for positioning said guiding member normally at a point between the opposite ends of the path of movement of the feeding member, said spring being arranged to yield in response to pressure of the feeding member during the latter portion of said feeding movement.

157. In mechanism for preparing lasting binders, the combination with binder forming means, of means for feeding a strand of binder material into operative relation to said forming means, said feeding means comprising a feeding member having a determinate length of feeding movement, a member for guiding said material in advance of the feeding member, and spring means for holding said guiding member normally at a point substantially midway of the path of movement of the feeding member in position to be engaged and moved forwardly by the feeding member in the latter portion of its feeding movement, said spring means being arranged to return the guiding member to its normal position upon a reverse movement of the feeding member.

158. In mechanism for preparing lasting binders, the combination with binder forming means, of means for feeding a strand of binder material into operative relation to said forming means, said feeding means comprising a feeding device mounted for forward feeding movement in gripping engagement with said binder material and for subsequent reverse movement, a guiding member in advance of said feeding device through which said material passes, and means comprising a spring and a co-operating abutment for positioning said guiding member normally at a point substantially midway of the path of movement of said feeding device in position to be engaged by said device and moved forwardly with it in the latter portion of the feeding movement.

159. In mechanism for peparing lasting binders, the combination with binder forming means, of means for feeding a strand of binder material into position to be operated upon by said forming means, and means for applying a lubricant to said strand of binder material during its feeding movement.

160. In mechanism for preparing lasting binders, the combination with binder forming means, of means for feeding a strand of binder material into position to be operated upon by said forming means, straightening mechanism through which said material is fed prior to its advance to the forming means, and means for applying a lubricant to said strand of material prior to its passage through the straightening mechanism.

161. In mechanism for preparing lasting binders, the combination with means for forming from a strand of wire a binder to extend round the end of a shoe to hold the upper in lasted position, of a tubular support through which said wire passes, rotatable wire straightening mechanism arranged to receive the wire from said tubular support, wire feeding mechanism between said straightening mechanism and the binder forming means, and a clutch mounted on said tubular support for imparting operative movements to said forming means and said straightening and feeding mechanisms.

162. In mechanism for applying lasting binders, the combination with means for forming from a strand of wire a binder to extend round the end of a shoe to hold the upper in lasted position, of a tubular support through which said wire passes, rotatable wire straightening mechanism arranged to receive the wire from said tubular support, wire feeding mechanism between said straightening mechanism and the binder forming means, and means for feeding lubricant into the interior of said tubular support to lubricate the wire prior to its passage to the straightening mechanism.

163. In mechanism for preparing lasting binders, binder forming means constructed to sever a section of binder material from a strand of such material and to bend the ends of the severed section to form a binder with projecting prongs adapted to be forced into a shoe, mechanism for feeding a strand of binder material into position to be operated upon by said forming means, clutch means for imparting operative movement to said feeding mechanism, and additional clutch means for initiating the operative movement of the forming means to determinate relation to the operative movement of the feeding mechanism.

164. In mechanism for preparing lasting binders, binder forming means constructed to sever a section of binder material from a strand of such material and to bend the ends of the severed section to form a binder with projecting prongs adapted to be forced into a shoe, mechanism for feeding a strand of binder material into position to be operated upon by said forming means, means including a clutch for imparting operative movement to said feeding mechanism, a second clutch through which movement is imparted to said binder forming means, and means driven by said first clutch for controlling the second clutch to initiate the operation of the forming means in determinate relation to the operation of the feeding mechanism.

165. In mechanism for preparing lasting binders, the combination with means for feeding a strand of binder material, of binder forming mechanism comprising an anvil plate having a continuous guiding face along which said material is fed and opposite end faces inclined to said guiding face for producing prongs at acute angles to the body portion of the binder, and bending members mounted for movement in paths parallel to said end faces of the anvil plate for bending the ends of a section of binder material over said faces.

166. In mechanism for preparing lasting binders, the combination with means for feeding a strand of binder material, of mechanism for forming from said material a binder to be applied round the end of a shoe to hold the upper in lasted position, said forming mechanism comprising a device having opposite end portions about which the ends of a section of material are to be bent to provide prongs for attachment to the shoe, and bending members arranged to co-operate with said device to bend the ends of the material, said bending members being provided with grooves to receive the end portions of the material in the bending operation.

167. In mechanism for preparing lasting binders, the combination with means for feeding a strand of binder material, of means for severing a section of said material and for bending the ends of the severed section to provide prongs to be forced into a shoe at opposite sides of the end portion of the shoe including co-operating members having cutting edges inclined lengthwise of the path of feeding movement of the material to produce sharp points on the material in the severing operation.

168. In mechanism for preparing lasting binders, the combination with means for feeding a strand of binder material, of binder forming mechanism for severing a section of said material of suitable length to extend round the end of a shoe to hold the upper in lasted position and for bending the ends of the severed section to provide prongs to be forced into the opposite sides of the shoe, said forming mechanism comprising bending members one of which is provided with a cutting edge inclined lengthwise of the path of feeding movement of the material, and a member having a similarly inclined edge to co-operate with said edge on the bending member to sever the material.

169. In mechanism for preparing lasting binders, the combination with means for feeding a strand of binder material, of binder forming mechanism for severing a section of said material of suitable length to extend round the end of a shoe to hold the upper in lasted position and for bending the ends of the severed section to provide prongs to be forced into the opposite sides of the shoe, means for effecting the discharge of the binder from said forming mechanism, and a support to receive the binder thus discharged.

170. In mechanism for preparing lasting binders, the combination with means for feeding a strand of binder material, of mechanism for preparing from said material a binder to extend round the end of a shoe for holding the upper in lasted position, and means automatically operative to effect the discharge of the binder from said binder preparing mechanism.

171. In mechanism for preparing lasting binders, the combination with means for feeding a strand of binder material, of binder forming mechanism for severing a section of said material and forming therefrom a binder to extend round the end of a shoe for holding the upper in lasted position, and means for releasing the binder to permit it to fall from said mechanism.

172. In a machine of the class described, the combination with means for forming a binder for use round the end of a shoe to hold the upper in lasted position and means for applying the binder to the shoe, of means for receiving the binder thus formed and for carrying it to a point remote from said forming means preparatory to its application to a shoe.

173. In a machine of the class described, the combination with means for forming a binder for use round the end of a shoe to hold the upper in lasted position, of a carrier arranged to receive the binder from said forming means and movable to convey the binder away from said forming means preparatory to its application to a shoe.

174. In a machine of the class described, the combination with power operated means for applying a binder round the end of a shoe, and starting means for initiating the operation of said binder applying means, of means for presenting a binder to said binder applying means, and a controlling device automatically operative to prevent operative movement of said starting means during the operation of said binder presenting means.

175. In a machine of the class described, the combination with power operated means for applying a binder round the end of a shoe, of means for presenting a binder to said binder applying means, and controlling mechanism automatically operative to prevent starting of said binder applying means during the operation of presenting the binder.

176. In a machine of the class described, the combination with power operated means for applying a binder round the end of a shoe, and starting means for initiating the operation of said binder applying means, of power operated means for presenting a binder to said binder applying means, controlling means for initiating the operation of said binder presenting means, and mechanism arranged to be operated by said controlling means for locking said starting means against operative movement.

177. In a machine of the class described, the combination with power operated end lasting mechanism having means for applying a binder round the end of a shoe, and starting means for initiating the operation of said lasting mechanism, of independently driven power operated means for presenting a binder to said lasting mechanism, controlling means for initiating the operation of said binder presenting means in determinate time relation to the operation of the lasting mechanism, and a device automatically operative also in time relation to said lasting mechanism for locking said starting means against operative movement and for holding it locked during the operation of the binder presenting means.

178. In a machine of the class described, the combination with power operated end lasting mechanism having means for applying a binder round the end of a shoe, and starting means comprising a treadle rod for initiating the operation of said lasting mechanism, of power operated means for presenting a binder to said lasting mechanism, controlling mechanism for initiating the operation of said binder presenting means, a locking member movable into position to co-operate with said treadle rod to prevent operative movement of said starting means, and connections between said controlling mechanism and locking member for moving said member to operative position.

179. In a machine of the class described, the combination with power operated end lasting mechanism mounted for movement toward and from a shoe and having means for applying a binder round the end of the shoe, and starting means for initiating the operation of said lasting mechanism, of power operated means for presenting a binder to said lasting mechanism comprising a carrier mounted independently of the lasting mechanism for movement toward said mechanism, and a controlling device arranged to be operated in time relation to said binder presenting means to lock said starting means against operative movement.

180. In a machine of the class described, the combination with power operated end lasting mechanism mounted for movement toward and from a shoe and having means for applying a binder round the end of the shoe, and starting means for initiating the operation of said lasting mechanism, of power operated means for forming a binder and for transferring the binder thus formed to the lasting mechanism while said mechanism is at rest, controlling means for initiating the operation of said binder forming and transferring means, and mechanism connected to said controlling means to be operated by movement of said controlling means for locking said starting means against operative movement.

181. In a machine of the class described, the combination with power operated pulling-over and toe lasting mechanisms including means for applying a binder round the end of a shoe, of means movable to present a binder to said binder applying means, and controlling mechanism automatically operative to prevent starting of the pulling-over and lasting mechanisms during the operation of presenting the binder.

182. In a machine of the class described, the combination with means for working an upper over a last, of a heel rest constructed 194. In a machine of the class described, a gripper comprising co-operating jaws and a gripper bar and a gripper casing, a closing slide in said casing for moving the jaws relatively to grip an upper, a latch for connecting the gripper bar to said slide to operate the slide through movement of the bar, a tripping member on said slide to release it from the gripper bar, a lever mounted on said casing and along which said tripping member is movable in the jaw closing movement of the bar, and means for moving said lever to operate the tripping member.

195. In a machine of the class described, a gripper comprising co-operating upper gripping jaws and including a tripping member to cause said jaws to open and release the upper, a lever mounted on the gripper for operating said tripping member, and a member movable along the gripper in wedging engagement with said lever for imparting movement to the lever to operate said member.

196. In a machine of the class described, a gripper comprising co-operating upper gripping jaws and including a tripping member to cause said jaws to open and release the upper, a lever mounted on said gripper in position to extend over said tripping member in the upper pulling operation, a slide movable along the gripper in wedging engagement with said lever to operate it, overlaying means mounted for movement toward the shoe, and connections to said slide arranged to be operated by said movement of the overlaying means for imparting jaw releasing movement through said lever to the tripping member.

197. In a machine of the class described, a toe gripper comprising a plurality of pairs of upper gripping jaws and a gripper bar and a gripper casing, said bar being movable relatively to the casing for closing the jaws on an upper, a tripping member movable with said gripper bar and also movable to cause said jaws to open and release the upper, a lever mounted on said casing for operating said tripping member, toe lasting mechanism mounted for movement toward the shoe, and mechanism arranged to be operated by said movement of the toe lasting mechanism to impart operative movement to said lever.

198. In a machine of the class described, the combination with end lasting mechanism having means for applying a binder about an end of a shoe to hold the upper in lasted position, of binder forming mechanism, and a device for carrying a binder from said forming mechanism to the lasting mechanism.

199. In a machine of the class described, the combination with end lasting mechanism having means for applying a binder about an end of a shoe to hold the upper in lasted position, of mechanism for forming a binder with angled ends adapted to be forced into the shoe, and a carrier constructed to receive the binder thus formed and movable to carry the binder to the lasting mechanism.

200. In a machine of the class described, the combination with end lasting mechanism having means for applying a binder about an end of a shoe to hold the upper in lasted position, of a carrier constructed to receive a binder prepared for use on a shoe and mounted for movement in a predetermined path from a binder receiving position into position to present the binder to the lasting mechanism.

201. In a machine of the class described, the combination with end lasting mechanism having means for applying a binder about an end of a shoe to hold the upper in lasted position, of binder forming mechanism, and means for carrying a binder from said forming mechanism to the lasting mechanism and for delivering the binder in position to be operated upon by the binder applying means.

202. In a machine of the class described, the combination with end lasting mechanism having means for applying a binder about an end of a shoe to hold the upper in lasted position, of a carrier for presenting a binder to said lasting mechanism, and a device mounted independently of said carrier for delivering the binder in position to be operated upon by the binder applying means.

203. In a machine of the class described, the combination with end lasting mechanism having means for applying a binder about an end of a shoe to hold the upper in lasted position, of binder forming mechanism, and means for transferring a binder from said forming mechanism to the binder applying means comprising a gripper arranged to deliver the binder in position to be operated upon by the binder applying means.

In testimony whereof I have signed my name to this specification.

CHARLES F. PYM.